United States Patent [19]

Newhouse et al.

[11] Patent Number: 5,362,923
[45] Date of Patent: Nov. 8, 1994

[54] SYSTEM FOR DISTRIBUTING AND MANAGING CABLING WITHIN A WORK SPACE

[75] Inventors: Thomas J. Newhouse, Grand Rapids; Donald A. Shepherd, Holland; Robert A. Harvey, Montague, all of Mich.

[73] Assignee: Herman Miller, Inc., Zeeland, Mich.

[21] Appl. No.: 960,086

[22] Filed: Oct. 9, 1992

Related U.S. Application Data

[63] Continuation of Ser. No. 798,925, Nov. 27, 1991.

[51] Int. Cl.$^5$ .............................................. E04H 1/00
[52] U.S. Cl. ........................................ 174/48; 52/239; 160/127
[58] Field of Search ................... 174/48, 49; 52/220.7, 52/238.1, 239; 160/127, 135

[56] References Cited

U.S. PATENT DOCUMENTS

| | | | |
|---|---|---|---|
| 3,865,969 | 2/1975 | Mulvey | 174/48 |
| 4,032,821 | 6/1977 | Keiser | 361/334 |
| 4,038,796 | 8/1977 | Eckel | 52/221 |
| 4,224,769 | 9/1980 | Ball | 52/36 |
| 4,255,611 | 3/1981 | Propst et al. | 174/48 |
| 4,370,008 | 1/1983 | Haworth et al. | |
| 4,619,486 | 10/1986 | Hannah et al. | 312/195 |
| 4,631,881 | 12/1986 | Charman | 52/220 |
| 4,685,255 | 8/1987 | Kelley | 52/36 |
| 4,831,791 | 5/1989 | Ball | 52/36 |
| 4,852,500 | 8/1989 | Ryberg et al. | 108/105 |
| 4,883,330 | 11/1989 | Armstrong et al. | 312/195 |
| 4,899,018 | 2/1990 | Sireci | 174/48 |
| 4,918,886 | 4/1990 | Benoit et al. | 52/221 |
| 5,209,035 | 5/1993 | Hodges et al. | 52/220.7 |

FOREIGN PATENT DOCUMENTS

| | | |
|---|---|---|
| 7831395 | 4/1979 | Germany . |
| WO-A-9107791 | 5/1991 | WIPO . |

Primary Examiner—Leo P. Picard
Assistant Examiner—David Tone
Attorney, Agent, or Firm—Willian Brinks Hofer Gilson & Lione

[57] ABSTRACT

The invention is a furniture system and method for distributing and managing cabling through a work space and assisting in facility space planning. The system includes a plurality of free-standing horizontal cable housing units which are aligned end to end, either in a straight line or at an angle. Each of these horizontal housing units includes a top, a bottom, and two sidewalls which together define a hollow chamber open at both ends. At least one of the sidewalls is easily demountable to provide access to the hollow chamber of the housing unit. The system further includes a first raceway for electrical power cabling mounted within the hollow chamber, and a second raceway for communication cabling mounted within the hollow chamber.

59 Claims, 19 Drawing Sheets

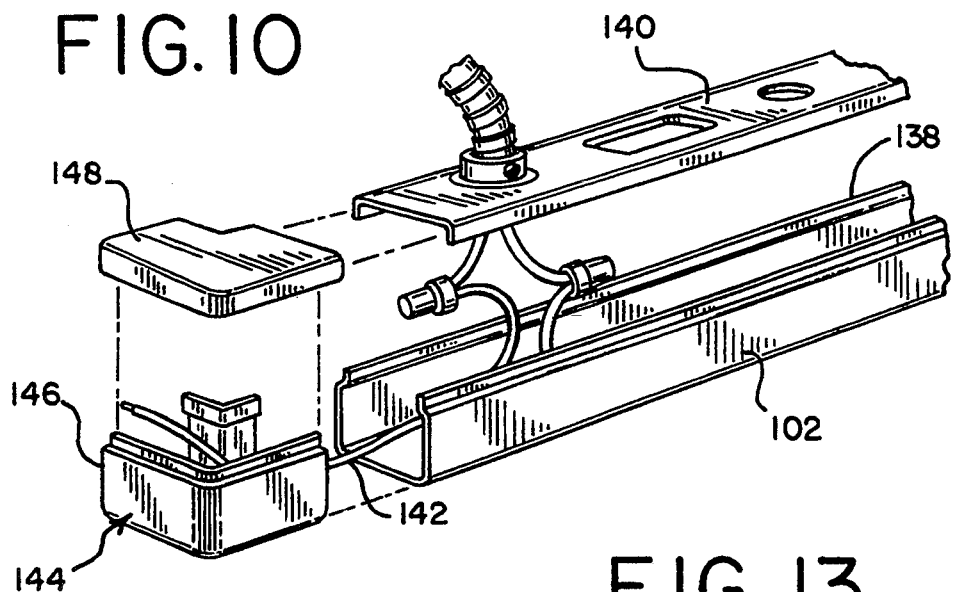
FIG. 10
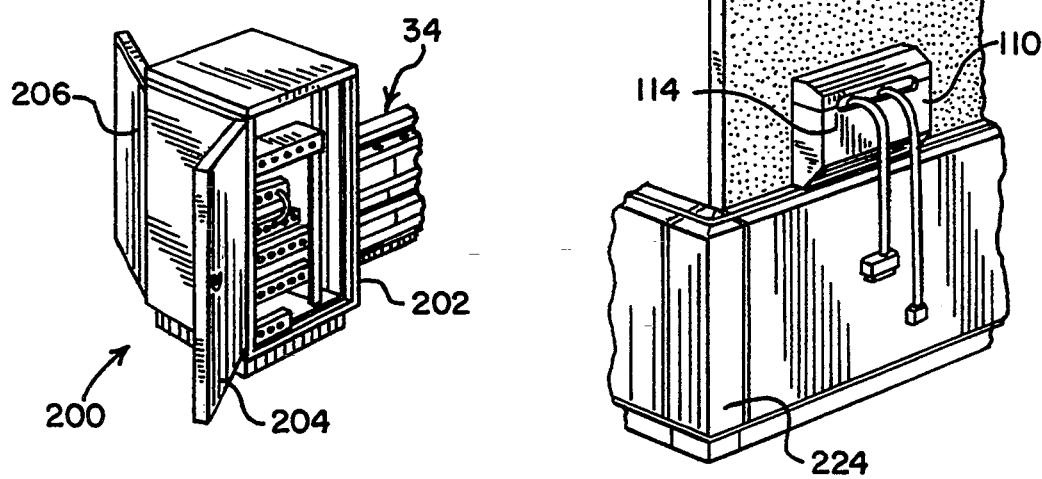
FIG. 12
FIG. 13
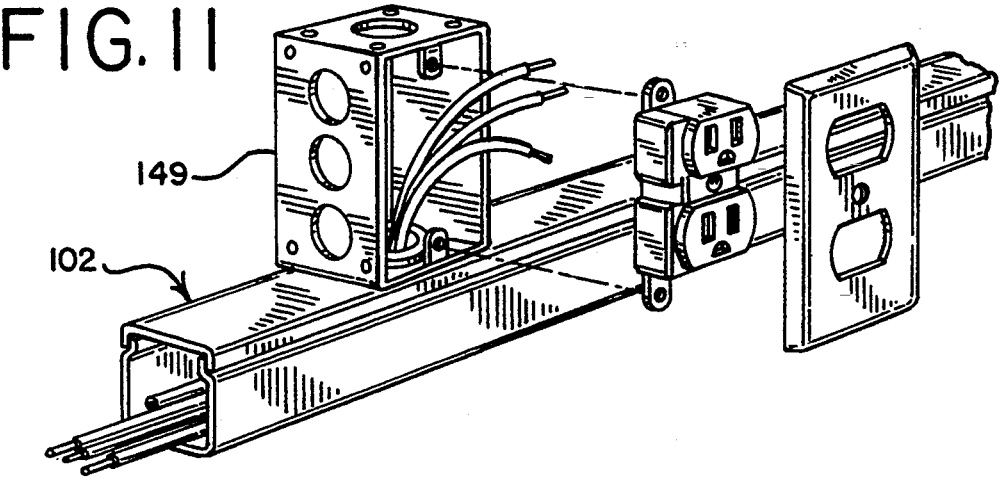
FIG. 11

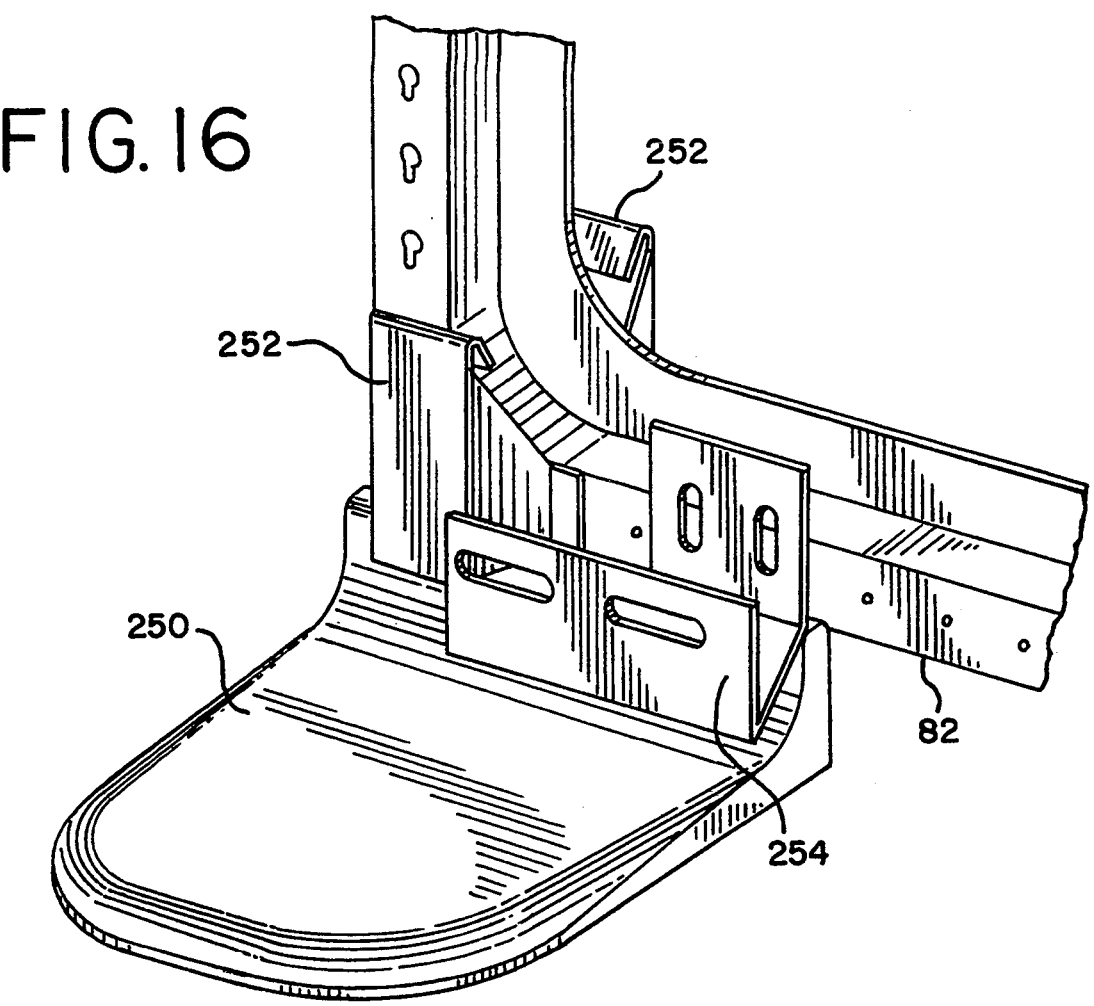

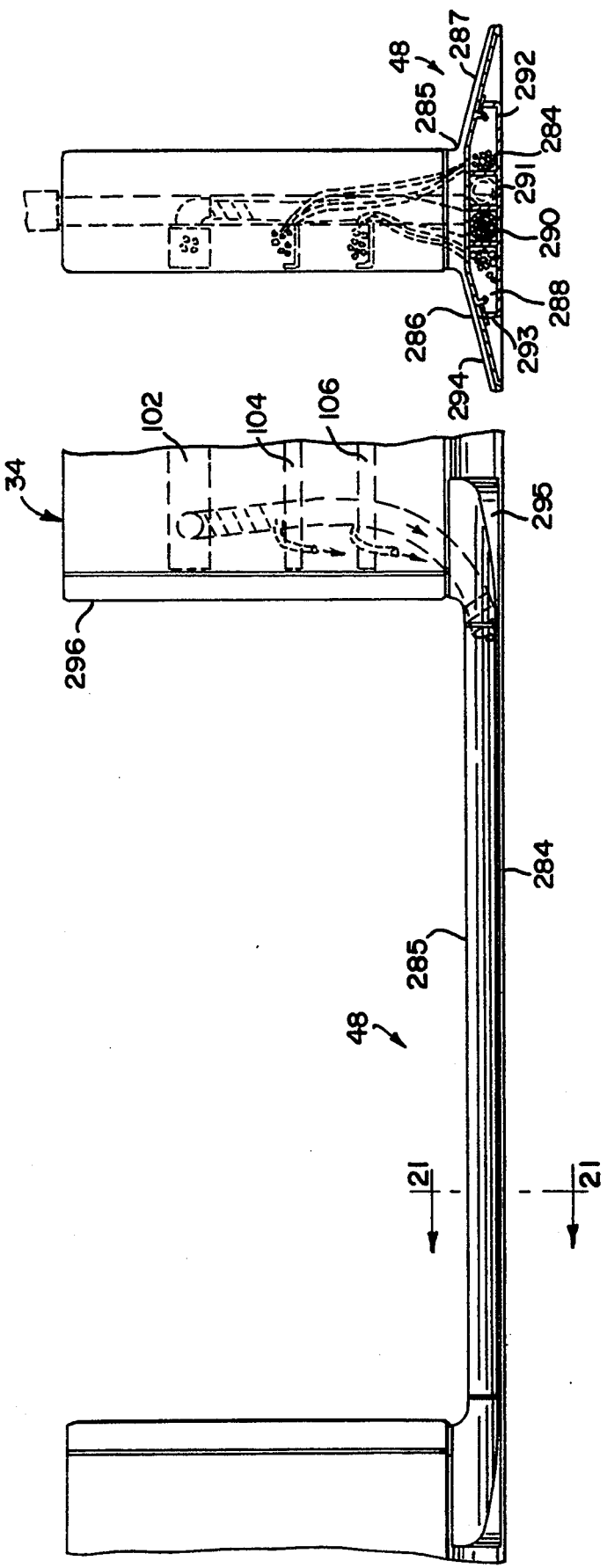

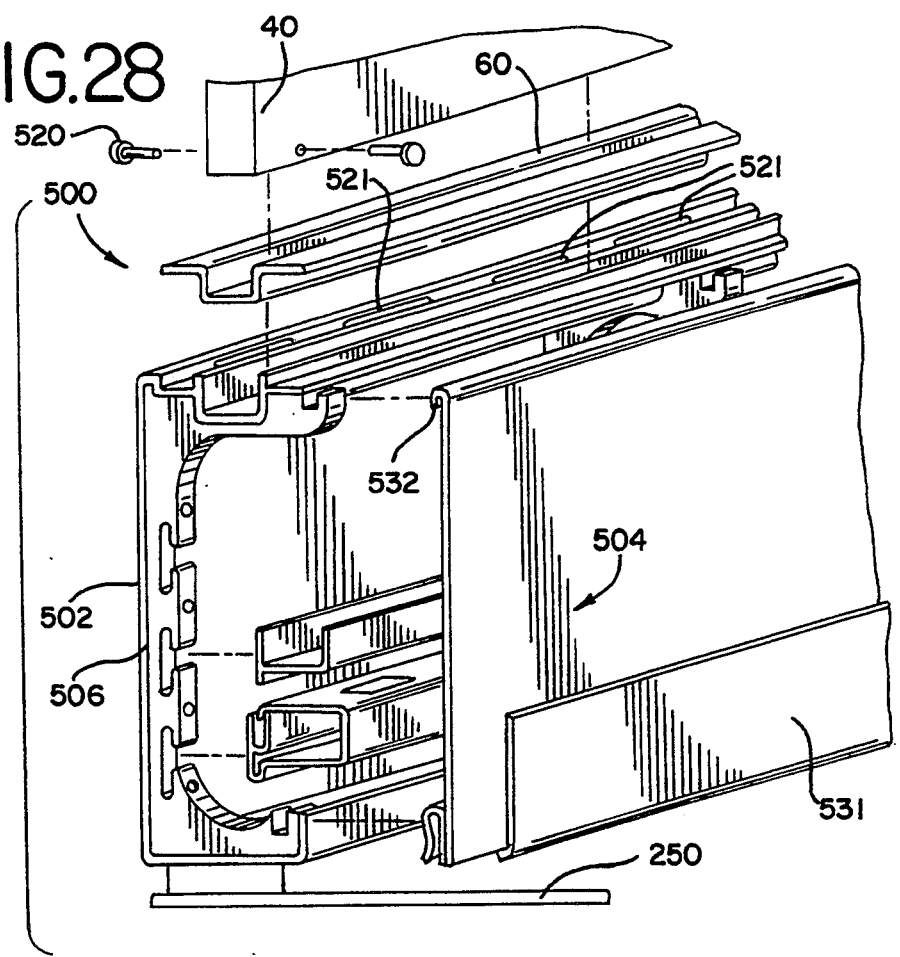
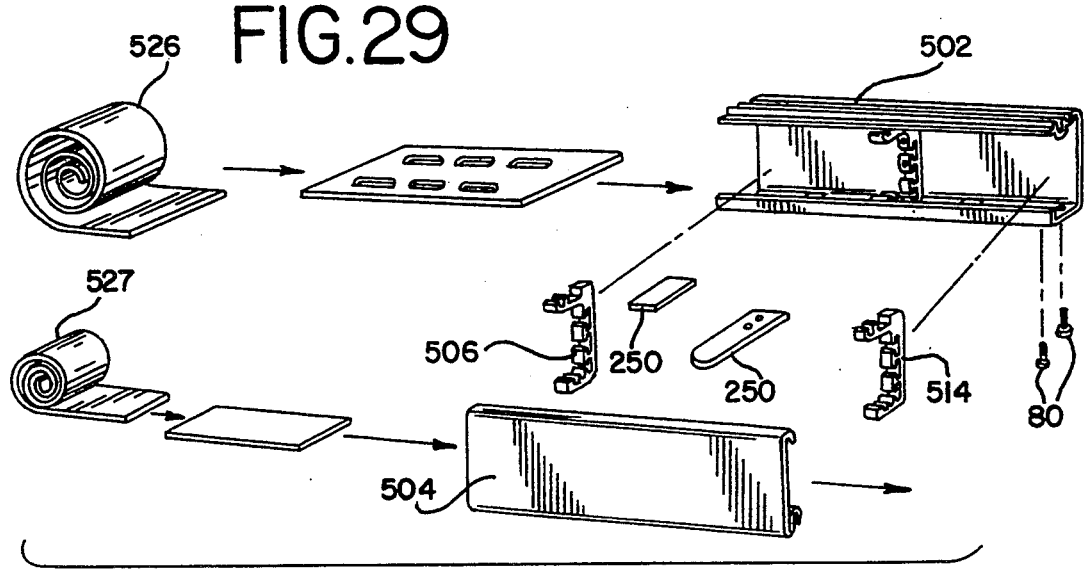

SYSTEM FOR DISTRIBUTING AND MANAGING CABLING WITHIN A WORK SPACE

RELATION TO OTHER APPLICATIONS

This application is a continuation in part of Ser. No. 07/798,925, filed Nov. 27, 1991, the entire disclosure of which is incorporated by reference.

BACKGROUND OF THE INVENTION

This invention relates to electrical, data, and communications distribution systems and space planning for a work environment.

The distribution of wiring or cabling for electrical service, data and communications is an important and rapidly evolving aspect of modern work place design, especially for office work environments. In many modern office systems, particularly those with sophisticated technology based work stations, it is essential to provide a high level of electrical, data, and communications service to workers for tools such as computers, printers, copying machines, fax machines, local area networks, voice mail, video, and the like. Every one of these modern tools requires at least one type of cabling. Some may only require electrical power, while others, such as a personal computer, may require electrical power, communications, and data cabling. Moreover, current trends suggest that this requirement for cabling distribution to worker stations within work spaces will only increase in the future.

The varied and increasing cabling requirements for offices with sophisticated work stations are often not met by traditional office designs. As a consequence, many such offices are poorly served by cable management or are served by makeshift or expensive solutions that provide only limited or temporary accommodation of cabling management needs.

One reason that some office designs have not kept up with modern cabling requirements relates to the boundary that has traditionally been set between where the architectural design of the building ends and where the design of the office floorplan begins. In designing office floorplans, office designers typically begin with certain structural constraints imposed by the building's architectural design. In particular, office designers start with certain permanent structural features of the building for distributing electrical power, communications, and data cabling.

One such permanent structural feature often included as part of the building is the utility closet. The utility closet typically provides for the distribution of electrical service between and among the different floors of the building. In addition to providing for the distribution of electricity, the utility closet also commonly serves as a location for the distribution of telephone or other communication service and may also provide for distribution of data service as well. A building may have more than one utility closet per floor depending upon the square footage of each floor as well as local building codes, the size of each utility closet, etc.

Distribution of electrical power, data and communications from the utility closet to the workers' locations may rely either on additional structural features provided by the building's architecture or it may utilize features added by the office designer. This distribution of cables for electrical power, data, and communications from the utility closet of the building to the worker is often referred to as "horizontal" wire distribution.

Horizontal wire distribution provided by the building's architecture is usually permanent and relatively unalterable. For example, some buildings provide subfloor conduits for horizontal wire distribution. These are constructed in a concrete floor of the building prior to the pouring-in of the concrete floor. Subfloor conduits allow cabling to be run horizontally across (actually under) a floor of a building from a utility closet to provide cabling to workers through floor "monuments" with power outlets or communications jacks.

Another type of permanent horizontal wiring distribution provided by a building's architecture includes conduits or passageway located in the walls of a building.

One drawback associated with these permanent types of horizontal wiring distribution is that replacement of existing wiring or placement of additional wires is a fairly complicated procedure requiring, for example, pulling the cables out of the conduit and pulling new cabling through. This may involve shutting down portions of the work staff during rewiring projects.

Another significant drawback associated with permanent wiring distribution systems is that their capacity is fixed as of the time they are constructed. Some buildings constructed as recently as 10 years ago were provided with horizontal wiring conduits under floors or in walls that are inadequate for the needs of the offices today. In some instances, subfloor conduits have become so full that they have been abandoned with the wires left in place.

Horizontal wiring distribution may also be provided by somewhat less permanent means, namely through a suspended ceiling, beneath a raised floor of the building, or in modular wall panels. Nevertheless, these systems also present certain disadvantages. For one thing, the cabling is relatively inaccessible in the suspended ceiling or raised floor systems. In particular, making wiring changes with a raised floor system requires the movement of office furniture and floor coverings. Likewise, in order to make wiring changes above a suspended ceiling, the workers must work on ladders that have to be positioned and repositioned around desks, cabinets, and the like. Thus, working on the above-ceiling cabling can become a major disruption to the entire office. Also, some device or structure is still necessary to bring the cabling down from above the ceiling to the worker stations, e.g. a power pole, or the like.

The constraints imposed by a building's permanent horizontal wiring distribution system, whether it is under the floor, over a suspended ceiling, through permanent walls, or a combination thereof, may be even greater when buildings are remodeled or rehabilitated. In remodelled or rehabilitated buildings, there may be fewer options for cabling distribution. The location and number of utility closets may be impossible or at least impractical to change. Also, it may be impractical to install conduits under a floor in a remodeled building. Likewise, it may also be impractical to locate cabling distribution channels in existing permanent walls of a building without extensive and costly construction. Although locating horizontal wiring above a suspended ceiling may still be an alternative, this may have the disadvantage that a suspended ceiling may not conform to the building's aesthetics or worse that there may not be room for a suspended ceiling.

One way that has been adapted for horizontal cabling distribution for use by interior designers and architects utilizes channels located in or under partition walls or panels. Examples of this approach are described in U.S. Pat. No. 4,619,456 and U.S. Pat. No. 4,631,881. The types of apparatuses described in both these patents relate to wall panels to which furniture, such as desktops or cabinets, can be connected. It can readily be appreciated that the use of wall panels for horizontal cabling distribution can involve significant compromises. First of all, it may not be possible or it may be unaesthetic to locate a wall panel at the specific location where the cabling distribution is required. Another disadvantage of using wall panels for cabling distribution is that the connection of furniture such as desk tops to the wall panels, as disclosed in the '486 and '881 patents, can substantially limit access to cabling channels in the interior of the panel especially at the location at which the furniture is connected to the wall panel. Still another possible disadvantage relates to the fact that the channels and or raceways provided with wall panels are typically of a limited size. Consequently, the wall panels may not have sufficient capacity to meet the needs of sophisticated work stations.

Although the considerations addressed herein relate primarily to the office environment, similar considerations apply to other types of work place settings, such as hospitals, commercial, research, academic and light industrial. Such work places also have a need for high levels of cabling distribution and management. Such work places could also benefit from a system apart from a building's cabling distribution system, that is readily accessible for cabling distribution for sophisticated computer or communications equipment.

SUMMARY OF THE INVENTION

Briefly stated, the present invention is a furniture system and method for distributing and managing cabling within a work place envelope.

The system includes a plurality of free-standing horizontal cable housing units which are aligned end to end, either in a straight line or at an angle. Each of these horizontal housing units includes a top and two sidewall means which together define a hollow chamber open at both ends and with either an open or a closed bottom. At least one of the sidewall means is easily demountable to provide access to the hollow chamber of the housing unit. The system further includes a first raceway for electrical power cabling mounted within the hollow chamber, and a second raceway or tray for communication cabling mounted within the hollow chamber.

The invention is also directed to a method of providing electrical power and communications cabling within a work place envelope, such as an office. The method begins with the provision of a plurality of horizontal frames. Each of these horizontal frames includes a first raceway for electrical power cabling and a second raceway for communications cabling. At least one of the frames is located so as to be adjacent a source of electrical power, while at least one of the frames is located so as to be adjacent a communications node. These horizontal frames are joined end to end, either in a straight line, or at an angle in a desired configuration. Electrical power cabling is provided which is connected to and extends from the source of electrical power. This electrical power cabling is laid in the first raceways of the horizontal frames so as to extend through at least a portion of the desired configuration of frames. Electrical power outlets may be provided at locations that are not pre-determined but are determined by the user as needed in the desired configuration. Likewise, communications cabling is provided which is connected to and extending from the communications node. This communications cabling is laid in the second raceways of the horizontal frames so as to extend through at least a portion of the desired configuration of frames. Communications cabling jacks are provided at locations that are not pre-determined but are determined by the user as needed in the desired configuration. Sidewalls are attached to the horizontal frames to thereby cover the first and second raceways.

In accordance with a preferred embodiment, the system also includes vertical housing units and lintel housing units for passing cabling over doorways and aisle ways within an office envelope. Also, the horizontal housing units in the preferred system include a frame on which the sidewalls are attached. Most preferably, each frame is made up of a plurality of rectangular frame subunits which are joined end to end. The preferred system further includes a third raceway or tray for data cabling.

One advantage of the present invention is that it presents a work place designer with greater flexibility in the distribution and management of cabling within a work space. In particular, because the distribution is not tied to the placement of permanent structures such as walls, or less permanent structures such as furniture, the designer is free to map out a configuration of horizontal housing units which is optimal for cabling distribution.

Another advantage of the present invention is that, because the system is independent of permanent structures and furniture, the horizontal cable housing units can readily be designed with sufficient capacity, namely with sufficient volume to handle the number of cables required for any application.

An advantage of the method aspects of the present invention resides in the fact that it allows for the orderly and efficient build up of work space within the work place envelope. In particular, the frames can be connected and installed according to the desired configuration. Next, the electrical power cabling, the communications cabling, and possibly the data cabling can be installed by the appropriate personnel and without interference. The sidewalls can be then be mounted, followed by installation of the appropriate office furniture and work tools.

The present invention, together with attendant objects and advantages, will be best understood with reference to the detailed description below read in conjunction with the accompanying drawings.

BRIEF DESCRIPTION OF THE DRAWINGS

FIG. 10 shows a perspective view of a portion of the first raceway of FIG. 6.

FIG. 11 is a perspective view of another portion of the first raceway of FIG. 6.

FIG. 12 is a perspective view of the local distribution frame of FIGS. 1-3.

FIG. 13 is perspective view of the preferred user access box.

FIG. 16 is perspective view of the foot shown in FIG. 6.

FIG. 20 is a plan view of another embodiment of the invention shown in FIGS. 1-3.

FIG. 21 is a vertical sectional view along lines 21—21 of FIG. 20.

FIG. 26 is an exploded perspective view of another embodiment of the present invention.

FIG. 27 is an end view of the embodiment depicted in FIG. 26.

FIG. 28 is another exploded view of the embodiment depicted in FIG. 26.

FIG. 29 is a representation of an assembly process for the embodiment depicted in FIG. 26.

DETAILED DESCRIPTION OF THE PREFERRED EMBODIMENTS

Figure 1:
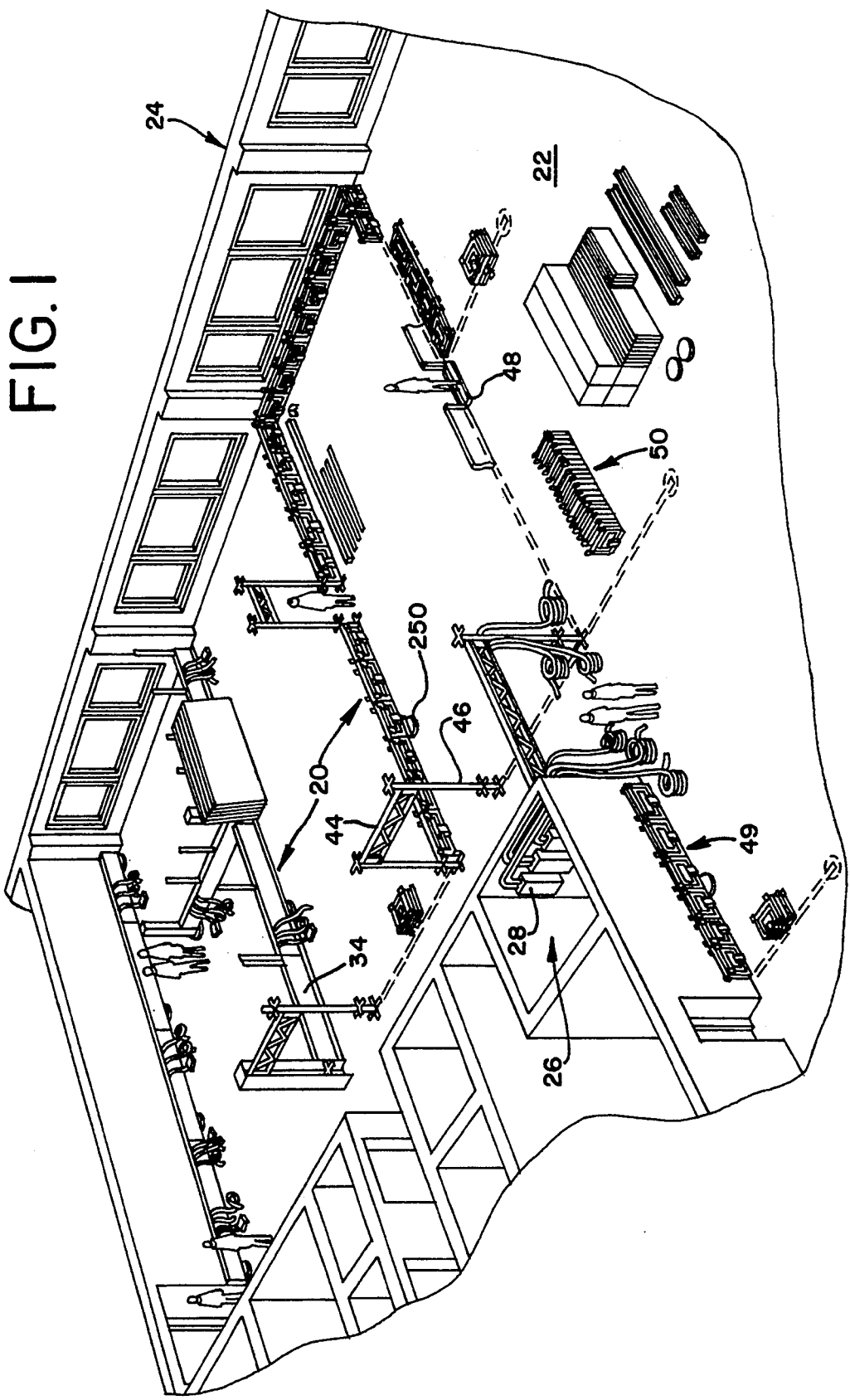
FIG. 1 is a perspective view of the most preferred embodiment of the present invention shown partially assembled.

Referring to FIG. 1, there is depicted a partially assembled view of a first embodiment of the present invention. This embodiment is an office furniture system 20. The office furniture system 20 is used in a work space 22 (also referred to herein as an "office envelope"). The work space or envelope 22 may be a generally open portion of a building 24. The building 24 includes a utility closet 26. The utility closet 26 provides cabling 28. The cabling 28 may be electrical cabling or cabling for data or telephone communications. Although in aspects of the present invention, data and telephone cabling are sometimes separately identified, it is understood that data and telephone can sometimes be combined and accordingly, separate cabling for data and telephone need not provided. Also although the embodiments of the present invention are described herein as particularly adapted for use in an office environment, it should be understood that the present invention may be used in other work environments, such as hospitals, commercial, research, and light industrial.

The furniture system 20 allows for distribution and management of the cabling 28 from the utility closet 26 throughout the area of the work space 22. The system 20 provides for a greater degree of cabling distribution and management in an office work space, in terms of overall capacity, level of distribution, and versatility, than in prior furniture products and systems.

The office furniture system 20 includes a number of components that cooperate to provide the high capacity cabling distribution and management system. A main component of the system 20 is a free-standing horizontal cable housing unit 34. In a preferred embodiment, the horizontal cable housing unit 34 is approximately 16 inches in height. The horizontal cable housing unit 34 is modular so that a series of like sized horizontal cable housing units may be connected end to end to form continuous, linearly extending cabling distribution passageways in the work area 22. These passageways may connect to other passageways in straight lines or may connect to other passageways at perpendicular angles.

Because the horizontal cable housing units 34 are low in height, they do not in themselves provide for privacy in the manner that wall panel units do. However, an additional component of the office furniture system 20 is a privacy screen 40 (e.g. FIGS. 2, 3, 6-9). The privacy screen 40 is an optional component to be used where needed in the office envelope 22. The privacy screen 40 may be mounted on top of the horizontal cable housing unit 34, so that the combination of the housing unit 34 and the privacy screen 40 can serve the functions of providing privacy and dividing up work areas in a manner similar to that provided by prior wall panel unit systems. However, the horizontal cable housing unit 34 can be used without the privacy screen 40 where the screen would not be appropriate, such as in a location of the office space where visual privacy is not desired. Thus, with the present system, cabling management and distribution can be provided in a furniture component that is separate from the provision of privacy wall panels. This versatility and flexibility are features not found in prior wall panel systems.

To accommodate cabling distribution and management about an open floor space envelope 22, additional components provided by the office furniture system 20 are a lintel member 44 and vertical housing units 46. The combination of two vertical housing units 46 and the lintel member 44 enables the distribution of cabling across walkways for passage of office workers. The combination of two vertical housing units 46 and the lintel member 44 provides for the distribution of cabling over walkways. The vertical housing unit 46 connects to the horizontal cable housing unit 34 and the lintel member 44 connects to vertical housing unit 46. The lintel member 44 and vertical housing unit 46 have an interior cross section comparable in area to that of the horizontal cable housing unit 34. Accordingly, the combination of the lintel member 44, vertical housing unit 46 and the horizontal cable housing unit 34 can provide a continuous, high-capacity cabling distribution passageway throughout the work space 20.

According to yet a further aspect of this embodiment, cabling may be distributed across an office worker walkway by means of an underpass unit 48. Underpass units 48 may be used to connect two horizontal housing units 34. The underpass unit 48 includes cabling passageways that are located upon the floor of the office space 22. The underpass unit 48 is adapted to readily allow office workers to pass over the unit while providing for the distribution of cabling across an office worker walkway through the office space 22. Further details relating to the underpass unit 48 are included below.

The horizontal cable housing units 34 may also be mounted on an existing permanent building wall, as shown at 49 and as described in more detail below, to distribute cabling along the wall as well.

Using the various components of the system 20, electrical, telephone, and/or data cabling can be distributed throughout an office envelope 22. The horizontal cable housing units 34 may extend in open portions of the work space without privacy screens or in divided portions of the work space with the inclusion of privacy screens 40 on top of the cable housing units 34 to define workers' areas. When the horizontal cable housing units 34 are used with lintel members 44 and vertical housing units 46, or with underpass units 48, cabling distribution may be provided across walk ways.

Figure 4:
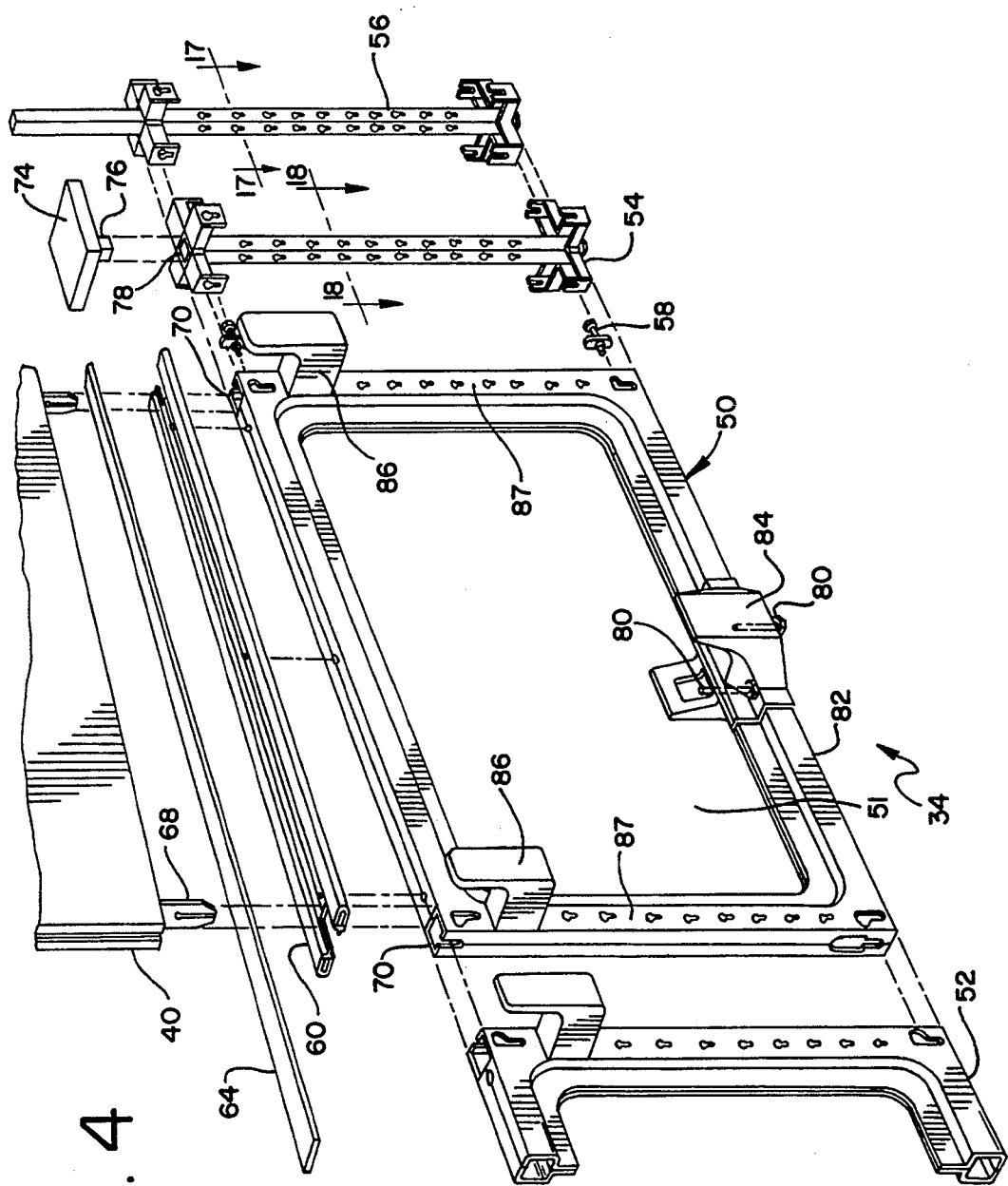
FIG. 4 is a perspective view of the preferred embodiment with one sidewall removed.

FIG. 4 depicts a first embodiment of the horizontal cable housing unit 34 (partially disassembled). The horizontal cable housing unit 34 includes a frame 50. The frame 50 is preferably rectangular in shape and includes an open middle portion 51. The frame 50 is adapted to be connected to a like frame unit, e.g., 52, of an adjacent housing unit in an end to end relationship to form a linearly extending run.

Figure 17:
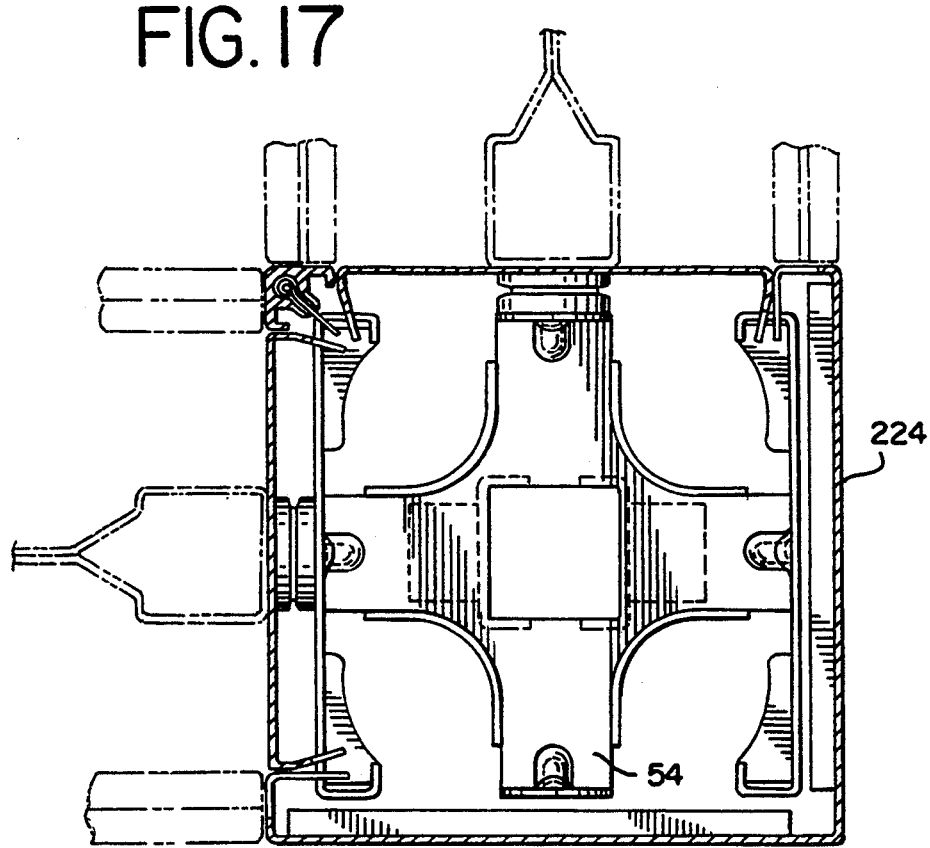
FIG. 17 is a horizontal sectional view along lines 17—17' of FIG. 4.
Figure 18:
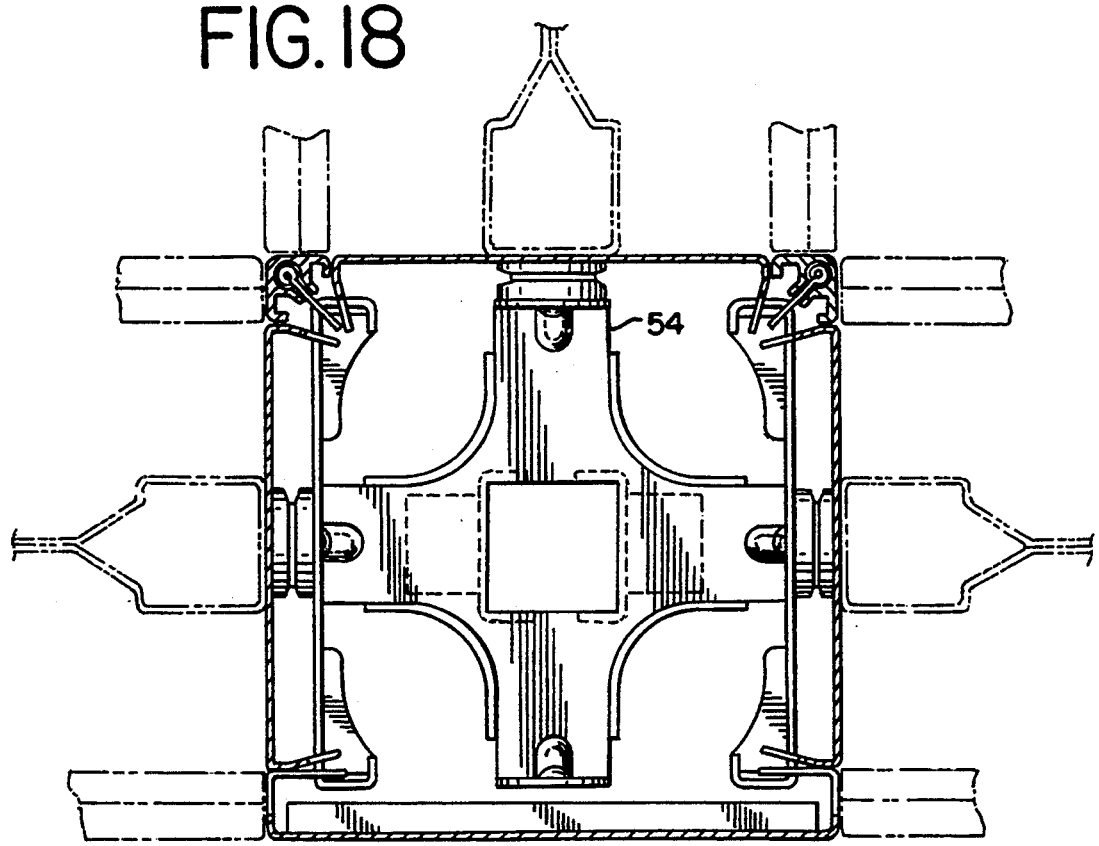
FIG. 18 is a horizontal sectional view along lines 18—18' of FIG. 4.

Connection between frames may be provided by post members, such as posts 54 and 56. Post member 54 provides for the connection of a frame, or a frame and screen, such as frame 50, to another frame (not shown) at a right angle. A connector means 58, such as a nut and bolt arrangement, may be used to fasten the frame 50 to the post member 54. Further details of the construction of the posts 54 and 56 are included in FIGS. 17 and 18.

As shown in FIG. 4, an upper cover 60 attaches to a top side 62 of the frame 50. An insert panel 64 may be fitted into a slot of the upper cover 60. The upper cover 60 and the insert panel 64 serve as the top exterior side the housing unit 34 and cover the frame 50. The upper cover 60 may be adapted to allow for the passage of cabling from the area adjacent to the frame 50 to an area above the housing unit 34 for distribution of the cabling to workers. The upper cover 60 may be made of an resilient material to allow for cabling to be passed around an edge of the upper cover 60.

As mentioned above, a privacy screen 40 may be optionally provided with the housing unit 34. In one embodiment, the screen 40 has one or more downward extending posts 68 that fit through the upper cover 60. The downward extending posts 68 extend past the upper cover 60 and fit into slots 70 in the frame 50. The downward extending posts 68 may be sized and adapted so that they fit in the slots 70 so that the screen may be fitted securely to the frame 50.

A corner post cover 74 may also be provided. The corner post cover 74 includes a downward extending post 76 that fits into a slot 78 located in the center of the post 54. The corner post cover 74 serves to cover the corner post 74.

The frame 50 is positioned on the floor of the office space 22. In a preferred embodiment, a pair of glides 80 are provided. The glides 80 extend from a lower side 82 of the frame 50. The glides 80 are preferably height-adjustable. The glides 80 may be threadably mounted in a foot member 84 which forms a portion of the lower side 82 of the frame 50.

Side panels (not shown in FIG. 4 but shown in FIG. 6) are connected to the frame 50. Panel mounting members 86 extend from the frame 50 to support the side panels to the frame 50. The side panel mounting members 86 preferably extend from vertical members 87 of the frame 50.

Figure 5:
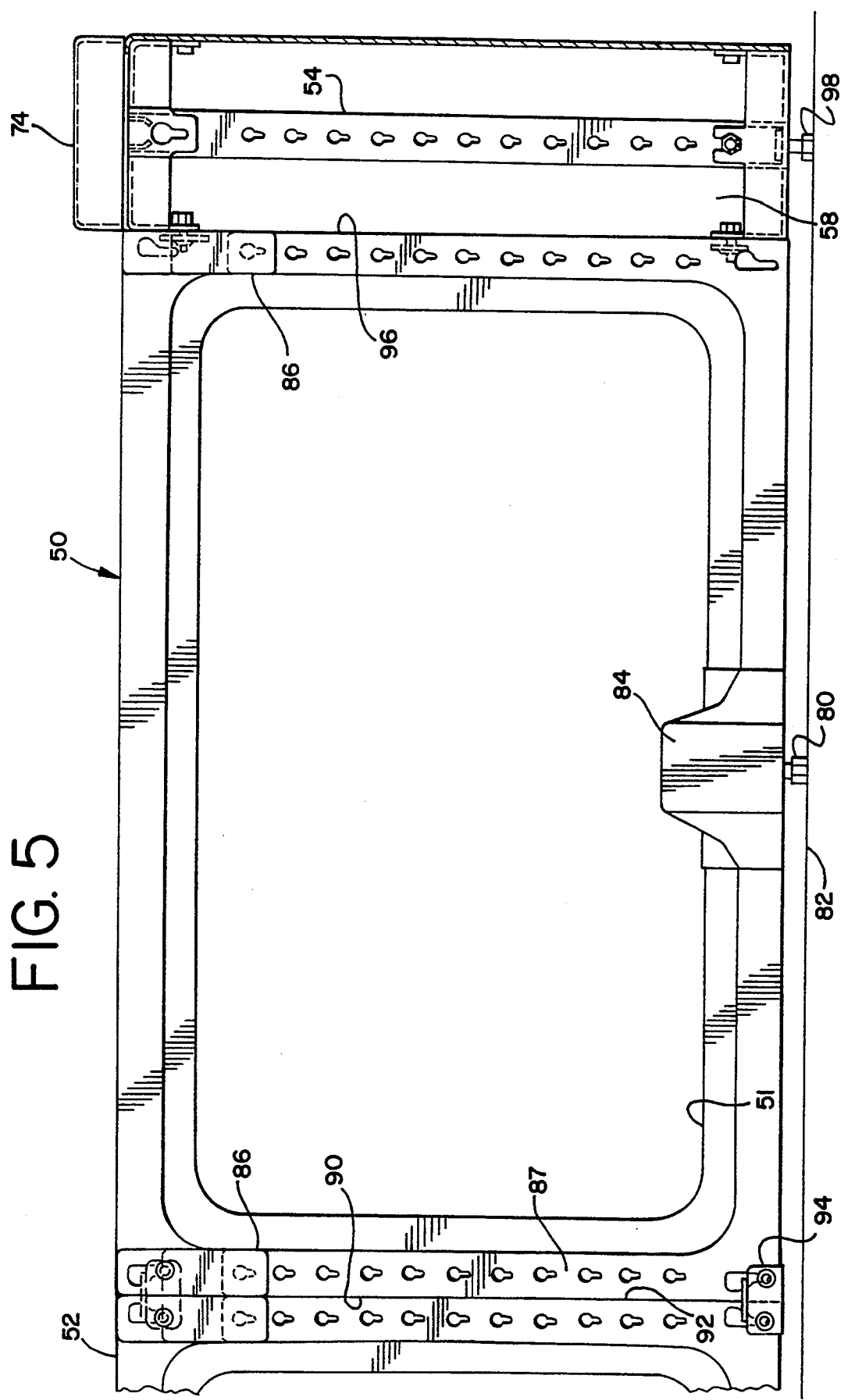
FIG. 5 is a side view of the preferred embodiment shown in FIG. 4.

FIG. 5 shows a side view of the frame 50 connected at its ends. On a first end 90, the frame 50 connects to the frame 52. This connection is in an abutting relationship wherein the end 90 of frame 50 directly abuts an end 92 of frame 52. Attachment between these ends 90 and 92 may be by connector means 94 such as a nut and bolt arrangement. At another end 96 of the frame 50, the frame 50 connects to the post 54. As shown in FIG. 5, the post 54 also includes an adjustable glide 98 mounted on a bottom side thereof.

Figure 6:
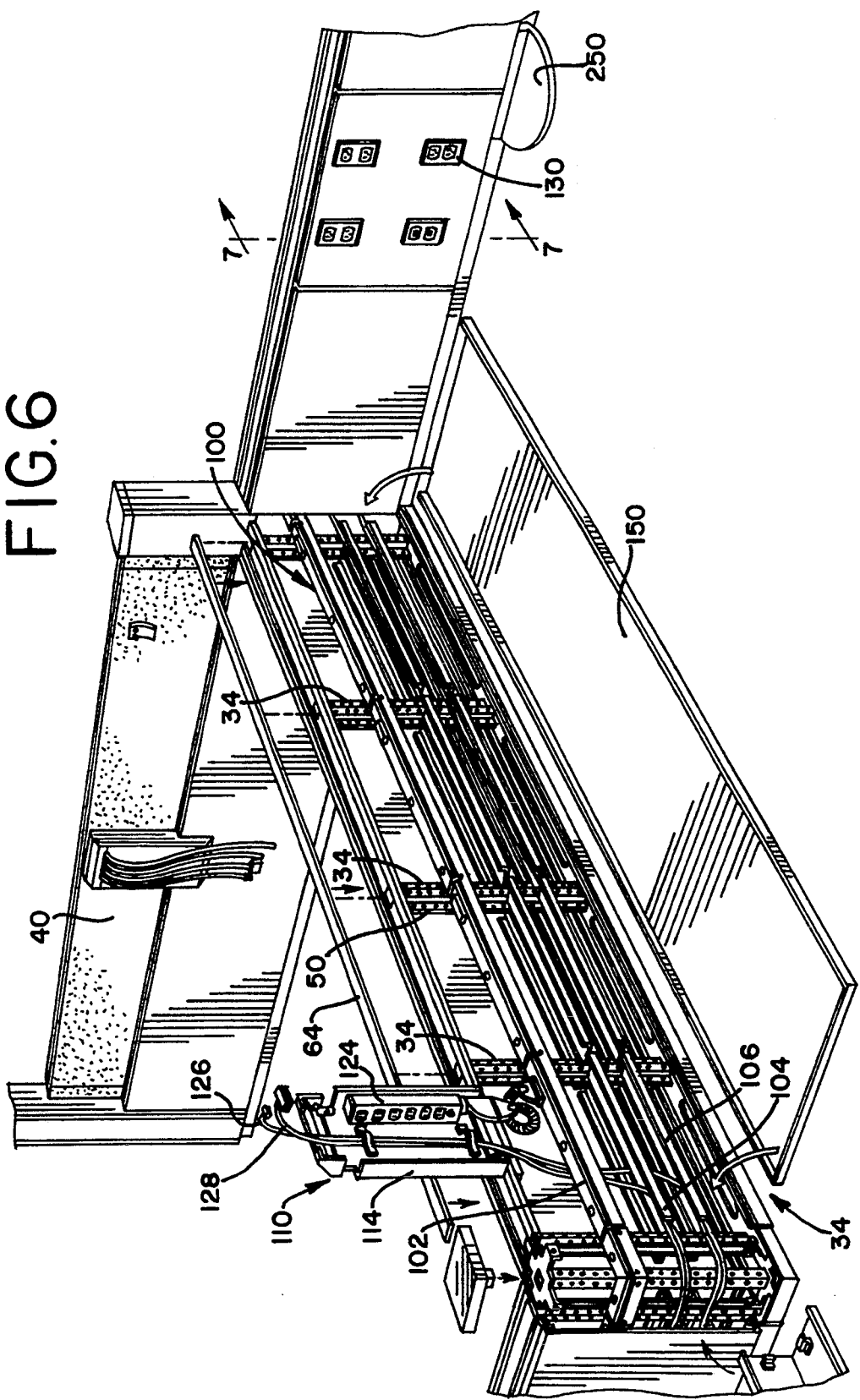
FIG. 6 is perspective view of a portion of the embodiment of FIG. 1 revealing aspects of another feature of the present invention.
Figure 9:
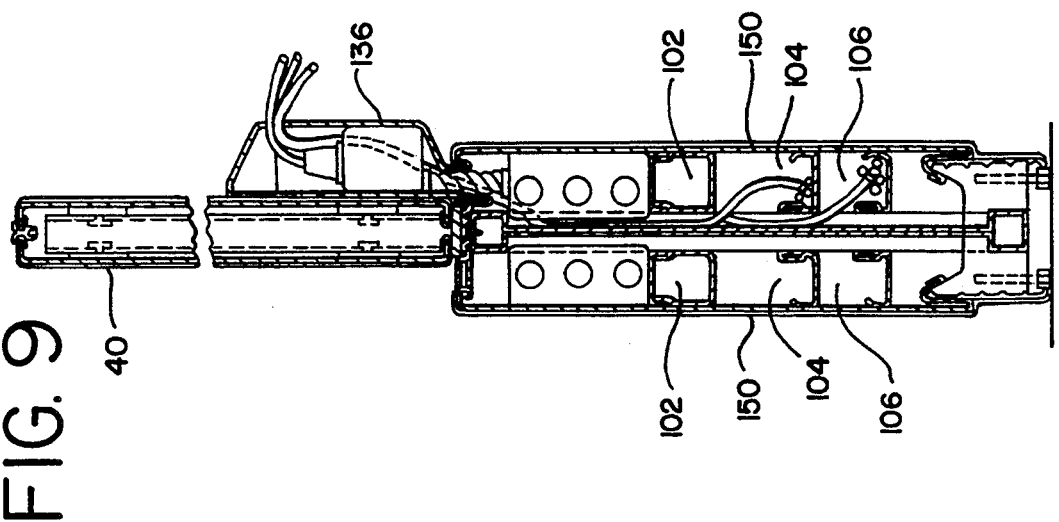
FIG. 9 is a cross-sectional view similar to that of FIG. 7 showing additional features of an embodiment of the invention.
Figure 8:
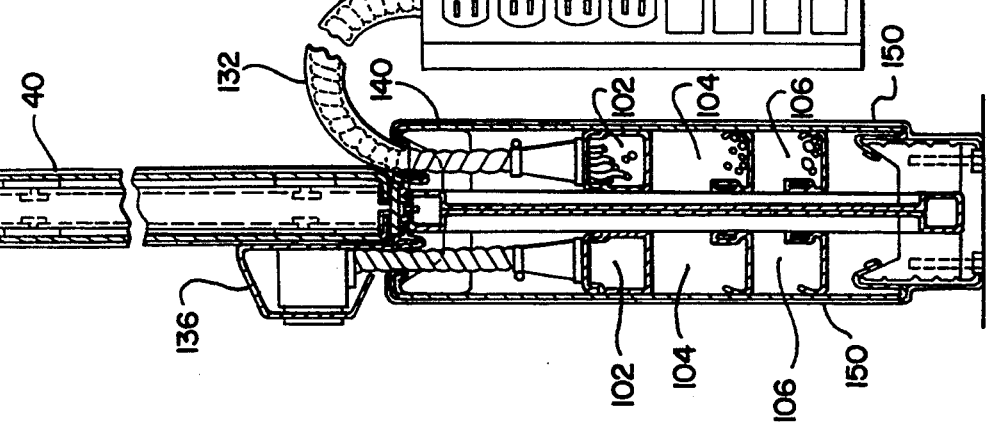
FIG. 8 is a cross-sectional view similar to that of FIG. 7 showing additional features of an embodiment of the invention.

FIG. 6 shows a perspective view of features of this embodiment of the invention. In FIG. 6, the horizontal cable housing units 34 are connected together to form a linearly extending run or course 100 of horizontal cable housing units 34.

Located within this course 100 are a plurality of raceways 102, 104 and 106. The raceways 102, 104, and 106 connect to the frames 50. These raceways 102, 104 and 106 may be formed as open troughs or as covered, shielded containers. In a preferred embodiment, the first raceway 102 is intended for electric cabling distribution and accordingly is covered and shielded on all sides. The covered raceway 102 preferably has one side, e.g. the top side, that is removable to provide access to the interior of the raceway 102 to install electrical cabling therein.

In one preferred embodiment, the electrical cabling is laid in the first raceway 102. The electrical cabling may be provided as shielded or unshielded cabling, and may be metal armored or plastic covered. The electrical cabling may also be provided in one or more electrical conduit in the first raceway. In alternative embodiments, the electrical cabling may be provided in wire harnesses such as provided and used in prior wall panel systems. This later embodiment would enable a ready compatibility with existing wall panel systems and would provide for easy snap together electrical connections.

Further in a preferred embodiment, the second raceway 104 and the third raceway 106 are intended for telephone and data cabling, respectively. Accordingly, shielding requirements for these raceways may be less stringent and these raceways may be provided with open tops. Hence, these raceways may be considered to be trays for holding the data and telephone cabling. As can be appreciated from FIG. 6, cabling can be extended through these raceways 102, 104, and 106 through the course 100 made up of the individual housing units 34 for distribution throughout the office space 22.

Cabling from these raceways is provided to office workers located in the area adjacent to the housing units 34 by several alternative means. One alternative means for providing cabling from these raceways to an office worker is by a user access box 110. The user access box 110 is connected to and extends from the top side 62 of the housing unit 34. The user access box 110 includes a box portion 114 having a hollow interior that communicates with the interior of the housing unit 34. The interior of the user access box 110 communicates with the portion of the frame 50 where the raceways 102, 104, and 106 are located. The user access box 110 may include an openable or removable cover portion 114 (shown in FIG. 13) that may be hinged to allow access from at least one side to provide for user access to the interior of the user access box 110.

The user access box 110 may include therein an outlet box 124 with receptacles that connect to the electrical cabling in the first raceway 102 to provide for electric power distribution. In addition, there may be provided in the interior of the user access box 110 the ends of a telephone cabling 126 provided from the second raceway 104 and a data cabling 128 provided from the third raceway 106. Alternatively, instead of cable ends for telephone and data access, the user access box 110 may provide for telephone and data jacks.

It is an aspect of the present invention that the locations at which the power, telephone, and data cabling is provided to the office worker is completely variable and flexible. For example, the user access box 110 may be located on the housing unit 34 at any location along its length. This is a significant departure from what is provided and available from prior wall panel systems in which the provision for cabling to office workers is provided only at specific determined locations, e.g. at the edges of wall panels or at the base board or the belt line level.

Figure 7:
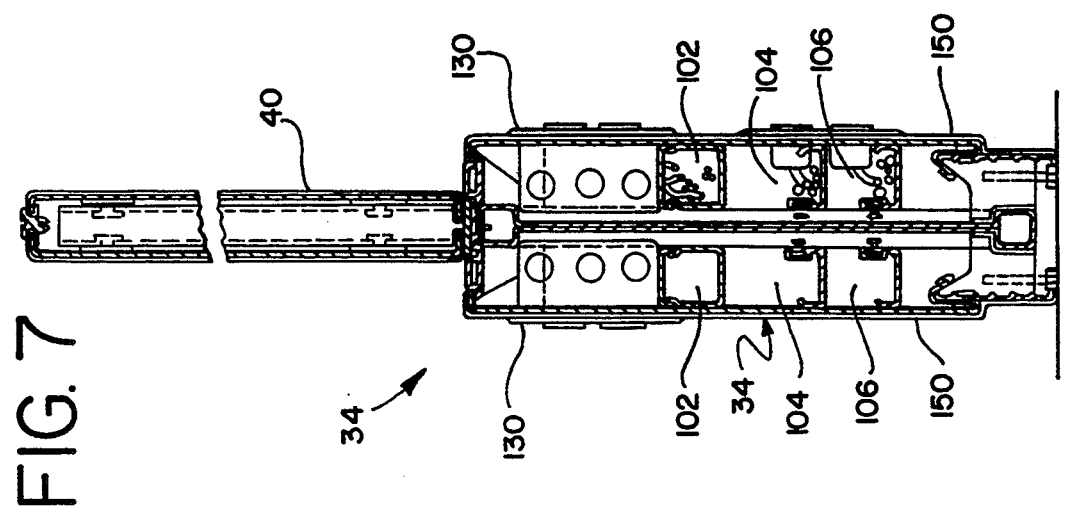
FIG. 7 is a cross-sectional view taken along line 7—7' of FIG. 6.

Provision for electrical power distribution from the housing unit 34 may be provided by means other than through the user access box 110. Provision for electrical power distribution from the raceway 102 of the housing unit 34 may be provided by receptacle 130, such as shown in FIG. 7, mounted on the exterior of the housing unit 34. In an alternative embodiment shown in FIG. 8, electrical power distribution from the raceway 102 of the housing unit 34 to a user may be provided from the raceway 102 by means of an armored cable 132 connected to a power strip 134. In an alternative embodiment shown in FIGS. 8 and 9, provision for electrical power distribution from the raceway 102 of the housing unit 34 may be provided by receptacles mounted in an outlet box 136 mounted above the housing unit 34.

FIG. 10 illustrates details relating to the first raceway 102. The first raceway 102 includes a channel member 138 and a top cover 140. Electrical cabling 142 may be placed in the channel member 138. A corner channel member 144 includes a raceway portion 146 and a corner cover portion 148. The corner channel member 144 is adapted to enable the raceway 102 to be used in a location where the linearly extending course makes a connection to another perpendicularly extending course. FIG. 11 illustrates mounting of a electric box 149 on top of the first raceway 102.

Referring again to FIG. 6, a side panel 150 attaches to the frame members 34. The side panel 140 forms an exterior surface of the housing unit 34. The side panel 150 may be long enough to cover a number of adjacent frame members 50. The side panel 150 mounts to the frame 50 by means of the side panel mounting members 86, shown in FIG. 4.

FIG. 12 shows a LDF (local distribution frame) 200. The LDF 200 connects to a housing unit 34. The LDF 200 is a generally rectangular box having openable access panels 204 and 206. The access panels 204 and 206 are preferably hinged to provide access to the interior of the LDF 200. In the LDF 200, cabling connections can be made. The LDF 200 may be located at accessible locations throughout the office work space 22 to facilitate ready modification to cabling distribution. The LDF 200 provides another level of user access at a location apart from the utility closet. In this context, the LDF 200 may serve as a node that can be connected to the utility closet or to other local distribution frames in a local area network (LAN).

Figure 15:
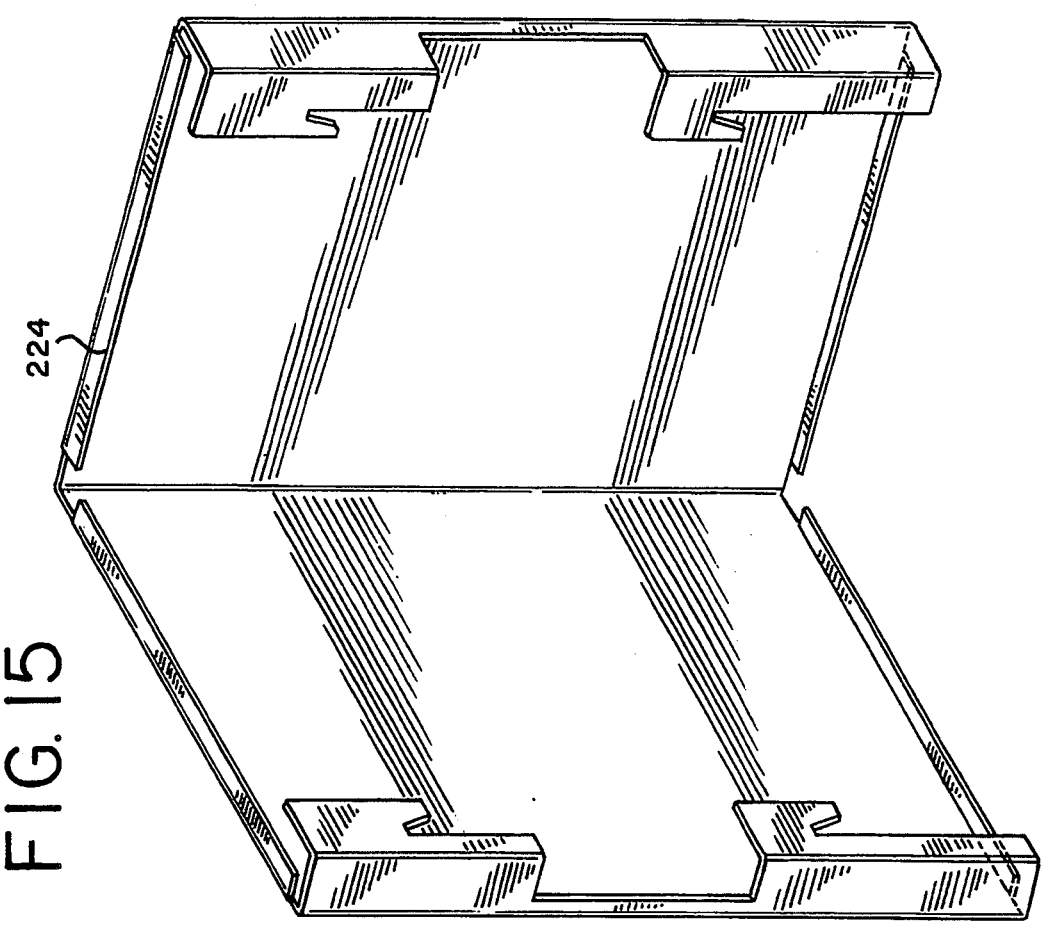
FIG. 15 is perspective view of a second embodiment of a corner cover of FIG. 14.
Figure 14:
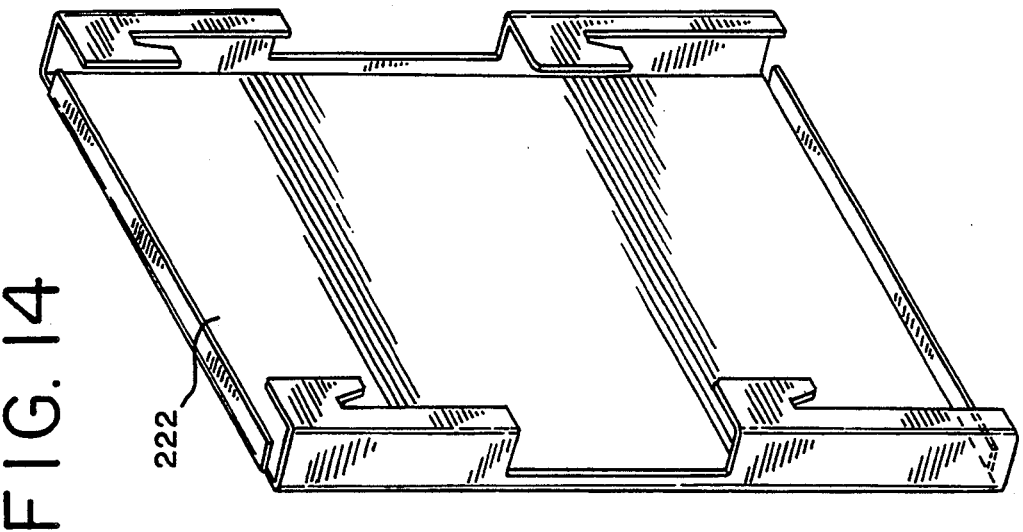
FIG. 14 is perspective view of a first embodiment of a corner cover as shown in FIG. 13.

Referring to FIGS. 14 and 15, there are shown covers 222 and 224. These covers 222 and 224 may be used at the location of the posts 54 and 56. The cover 222 is used at a terminus. The cover 224 is used at a location where linearly extending courses connect perpendicularly.

Referring to FIG. 16, where needed, a foot member 250 may be used to support the housing units 34. The foot member 250 attaches to the lower end 82 of the frame 50. The foot member 250 has a low tapering profile and extends approximately 10 inches laterally from the frame unit. The foot member 250 may include a first bracket means 252 that connects to the frame member 50. A second support means 254 may be provided and is adapted and positioned to support the side panel 150. The foot member 250 may be used for example at the terminus of a linearly extending course of horizontal housing units 34 to provide additional stability.

Figure 2:
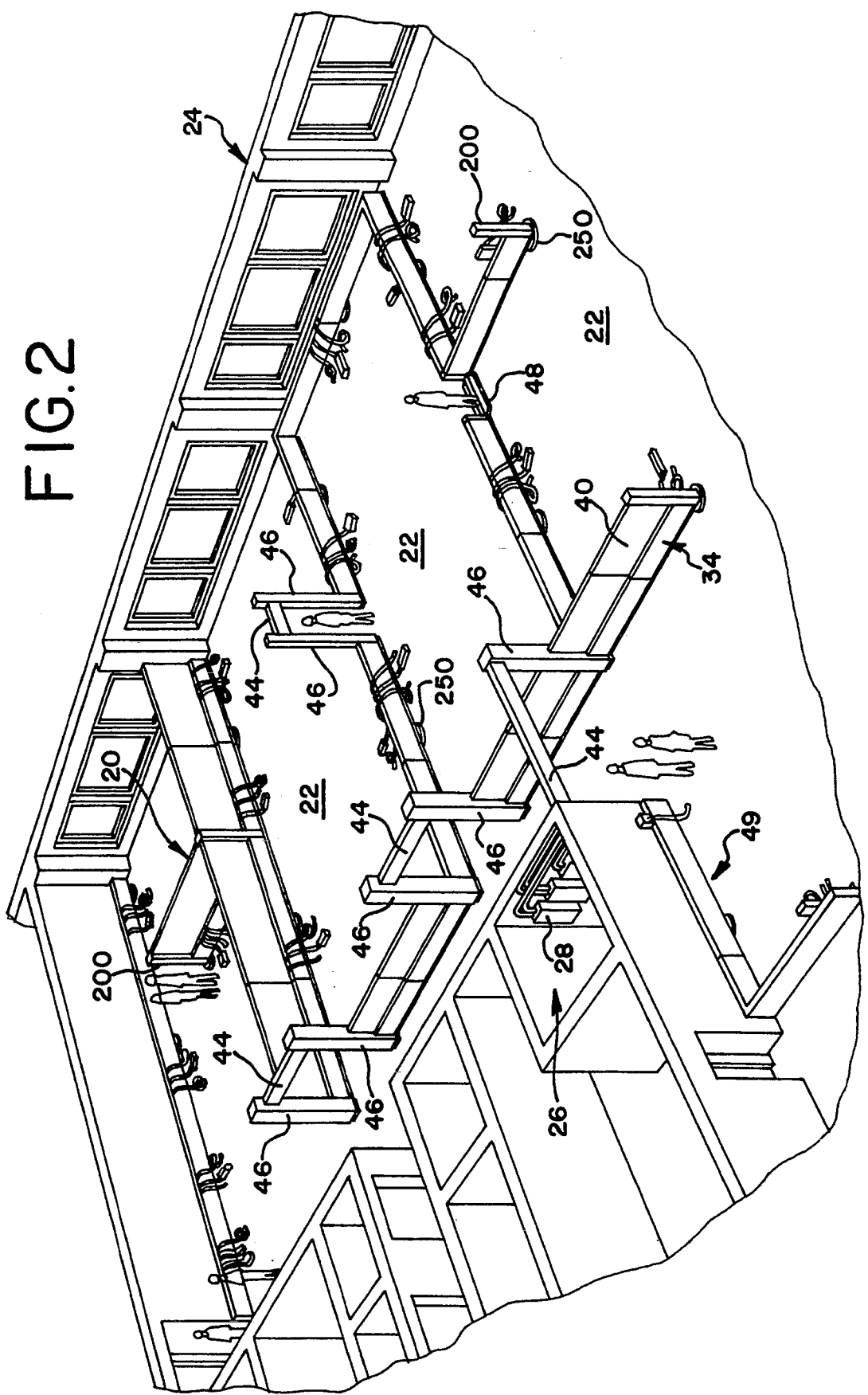
FIG. 2 is a view similar to FIG. 1 which shows the system fully assembled.
Figure 3:
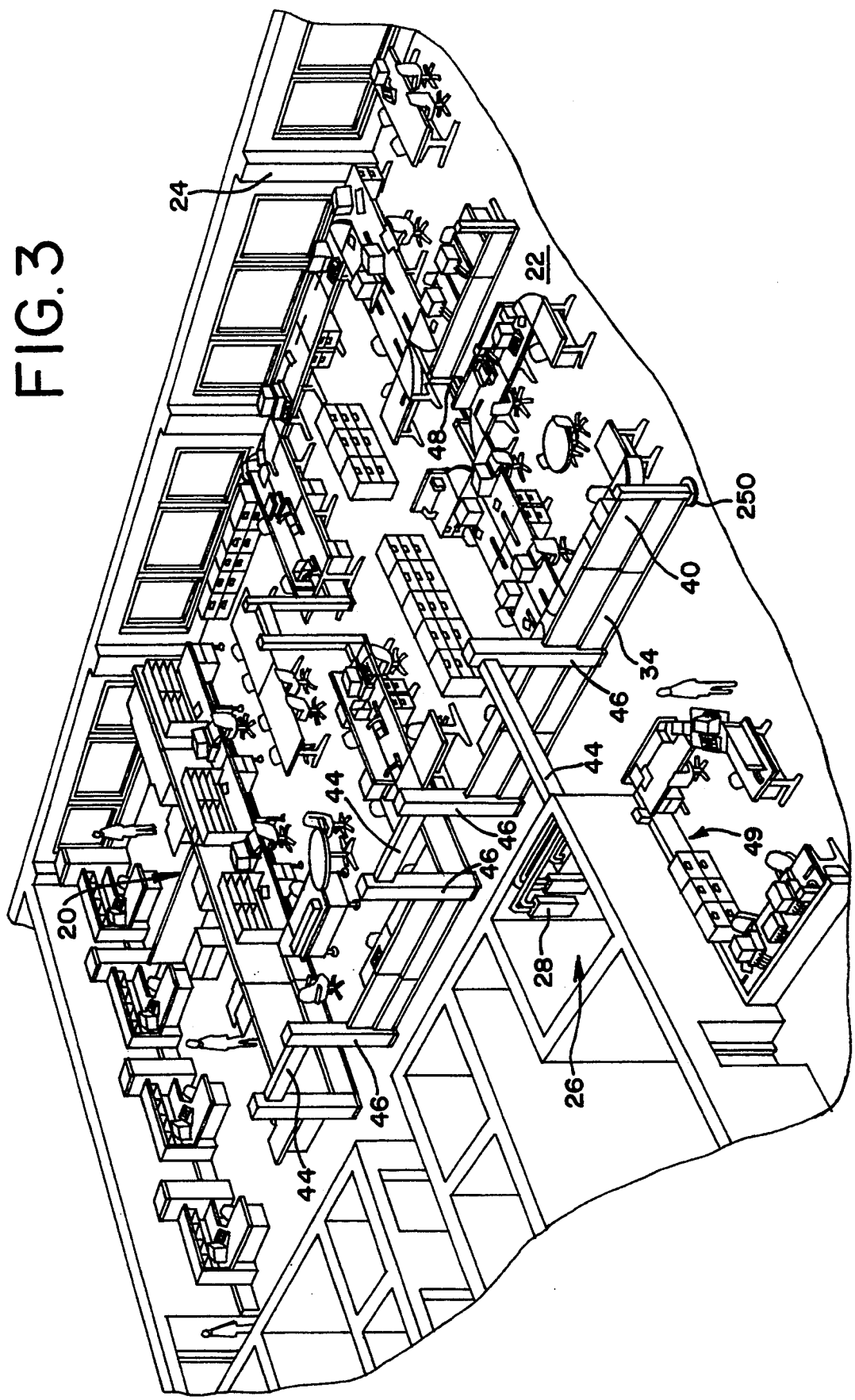
FIG. 3 is a view similar to FIG. 1 which shows office furniture and appliances installed around the most preferred embodiment.
Figure 19:
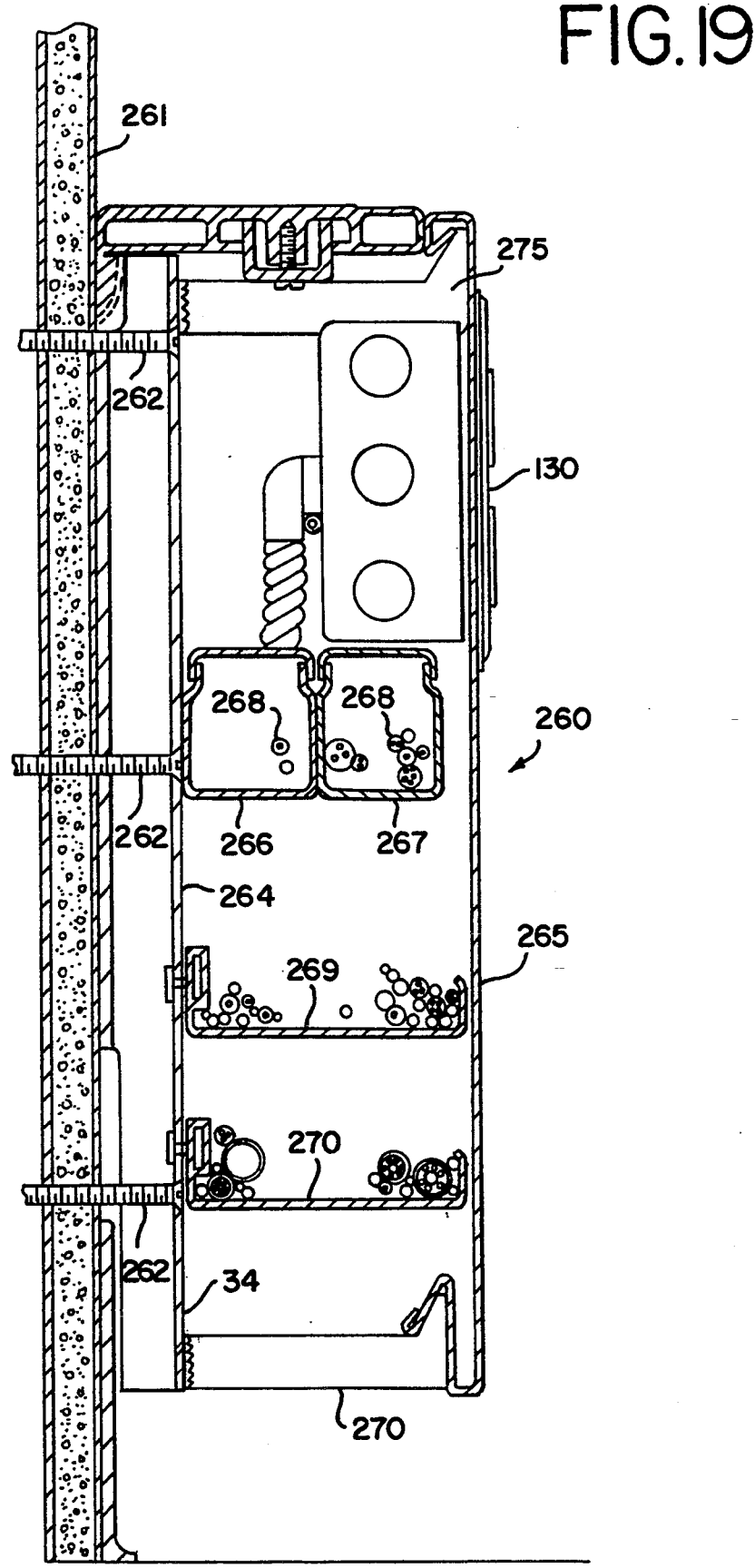
FIG. 19 is vertical sectional view of a wall mounted embodiment of the present invention shown in FIGS. 1-3.

As mentioned above, in the present embodiment, the cabling distribution units may be installed not only as free standing members, like furniture, but in the present embodiment at least some of the units may be installed by attachment to existing permanent structures, such as walls. This type of connection is illustrated in FIGS. 1–3 at 49 and in FIG. 19. Referring to FIG. 19, a wall mounted housing unit 260 is mounted to a structure, such as permanent wall 261. The permanent wall 261 may be a structure provided by the building or it may be a less-than-permanent wall. For example, the permanent wall 261 may be a concrete or brick support wall or it may be a non-supporting interior wall, e.g. drywall mounted on studs, or may be a modular wall or movable wall panel system.

As illustrated in FIG. 19, the wall mounted housing unit 260 is attached to the wall structure 261 by an attaching device 262. In the embodiment shown in FIG. 19 the attaching device 262 is shown to be comprised of threaded bolts. It should be understood that other types and means of attachment may be provided. The wall mounted housing unit 260 may conform in size generally to the free standing housing unit 34. This would provide for aesthetic benefits, i.e. balance, as well as practical advantages. For example, many of the same component parts may be utilized in the wall mounted housing unit 260 as in the free-standing, floor-mounted housing unit 34. In one embodiment, the wall mounted housing unit 260 has a generally rectangular cross section having a back wall 264 which includes the means for attaching to the permanent wall 261. A front wall 265 is attached to the back wall 264. The front wall 265 is preferably readily removable in the manner of the panels 150, described above. In a preferred embodiment, the front wall 265 may be of the same or similar construction as the panel 150 for both aesthetic and practical purposes, as mentioned above.

Because the back wall 264 is connected to the permanent wall structure 261, the back wall 264 may serve to provide similar functions as the frame member 50 used in the free-standing version of the housing unit, described above. For example, the back wall 264 may have attached to it raceways 266 and 267 which may serve for the distribution of electrical cabling 268. The back wall 264 may also be used to support additional raceways 269 and 270 which may be used for the distribution of telecommunications and data cabling in the manner as raceways 104 and 106, respectively, described above. Note that the additional raceways 269 and 270 may be provided in larger sizes than raceways 104 and 106. This would provide a similar capacity for telecommunications and data cabling distribution through a wall mounted housing unit 260 as in a free standing housing unit 34, taking into account that in a free standing housing unit a pair of each of the raceways 104 and 106 may be provided—one on either side of the frame 50. Because the back wall 264 may provide for some of the functions of the frame member 50 of the free standing housing unit 34, the frame member may be omitted in the wall mounted housing unit 260, as shown in the embodiment in FIG. 19.

In the embodiment shown, the front wall 265 is attached to the rest of the unit and in particular to the back wall 264 by means of attaching members, such as upper bracket 275 and lower bracket 276. These brackets may be provided with inclined forward mounting surfaces 277 onto which the front wall may be attached by hanging.

Also provided in this embodiment is an upper surface 280. The upper surface 280 may be connected to the upper bracket 275 by a suitable means. The upper surface 280 forms a top side of the wall mounted housing unit 260. The wall mounted housing unit 260 may also be provided with electrical outlet receptacles 130 mounted in the front wall 265 as in the embodiments previously described. In addition, there may be provided outlet jacks (not shown) for telephone and data in a similar manner as described above, such as by providing a user access box 110.

As mentioned above, an additional component of the system 20 includes an underpass unit 48. The underpass unit 48 may be provided for distributing cabling across worker walkways, for example. Referring to FIGS. 20 and 21, there is illustrated an embodiment of the underpass unit 48. The underpass unit 48 includes a low, flat structure suitable for mounting or otherwise positioning on a floor of the office envelope. Accordingly, for this reason, the underpass unit 48 has a generally flat bottom 284. The underpass unit 48 also has an upper side 285 formed of inclined surfaces, 286 and 287. The surfaces 286 and 287 of the underpass unit 48 are provided with a very low incline to allow office workers to readily walk over it without inconvenience. The low incline is also provided in order to allow wheeled devices to readily pass over the underpass unit 48, such as wheeled mail carts, dollies, etc. The low inclined upper surfaces 286 and 287 of the underpass unit 48 avoid imposing a barrier to wheel chair access. In a preferred embodiment, the underpass unit is approximately 1.2 inches in height and is approximately 14 inches wide.

The underpass unit 48 has included therein passageways, e.g. 288, 290, 291 and 292. These passageways provide for distribution of cabling across a human walkway by running the cabling underneath the walkway via the passageways 288, 290, 291, and 292. In a preferred embodiment, the electrical cabling is included in passageways 290 and 291. This is because these passageways may be provided with a greater height than passageways 288 and 292 since they are in a central portion of the underpass unit 48. In the preferred embodiment, the passageways 290 and 291 are provided with an internal height of approximately 1 inch to facilitate accommodating a 1 inch outer diameter electrical conduit. In a preferred embodiment, two passageways, 290 and 291, are provided for electrical cabling distribution. This is to maintain one passageway for electrical transmission cabling which is maintained free of interference whereas the other passageway may be provided for electrical cabling which is not maintained to this more stringent standard.

The passageways 288 and 292 are provided for the distribution of telephone and data cabling. These passageways may be provided in the section of the underpass unit 48 that corresponds to the inclined surfaces 286 and 287 and therefore these sections may have less height clearance, at least in portions thereof, than the electrical passageways 290 and 291. Some telephone and data cabling require only small height clearance and therefore can be accommodated in these passageways 288 and 292.

In a preferred embodiment, the underpass unit 48 is made of a frame 293 of a structurally strong material, such as aluminum, steel, plastic, wood, etc. The underpass unit 48 may also be provided with an cover member 294 located over the frame 293. The cover member 294 may be provided to be suitable for walking upon by office workers and for rolling over by wheeled devices. Accordingly, the cover member 294 may be made of non-slip type material or have a grooved or similar type of surface. In a preferred embodiment, the cover member 294 may be made of an extruded plastic. In an alternative embodiment, the cover member 294 may provided integral with the frame member 293. In such an alternative embodiment, the upper surface of the frame 293 may be provided with a pattern, e.g. horizontal grooves, to enhance footing.

The underpass unit 48 connects to horizontally extending housing units 34 by means of underpass end boots 295. An end cap 296 provides a horizontal terminus for the housing unit 34. Accordingly, the end cap 296 fits generally on the end of the housing unit 34. The electrical, telephone, and data cabling located in the housing unit 34 is run out of the raceways 102, 104 and 106, in which they are located in the housing unit 34, before the terminus of the housing unit 34 at the end cap 296. The cabling is run down into the underpass end boot 295 of the underpass unit 48. The cabling passes through the underpass end boot 295 into the passageways 288, 290, 291, and 292 located in the frame 293 of the underpass unit 48 into another, corresponding underpass end boot located at the opposite side of the underpass unit where the cabling may then be run into raceways in another housing unit. The underpass end boot 295 is sized and adapted to receive therein a corner of the housing unit 34. In a preferred embodiment, the underpass end boot 295 is made of pressure formed plastic material, although other materials may be used, such as metal, wood, fiberglass, etc.

Figure 22:
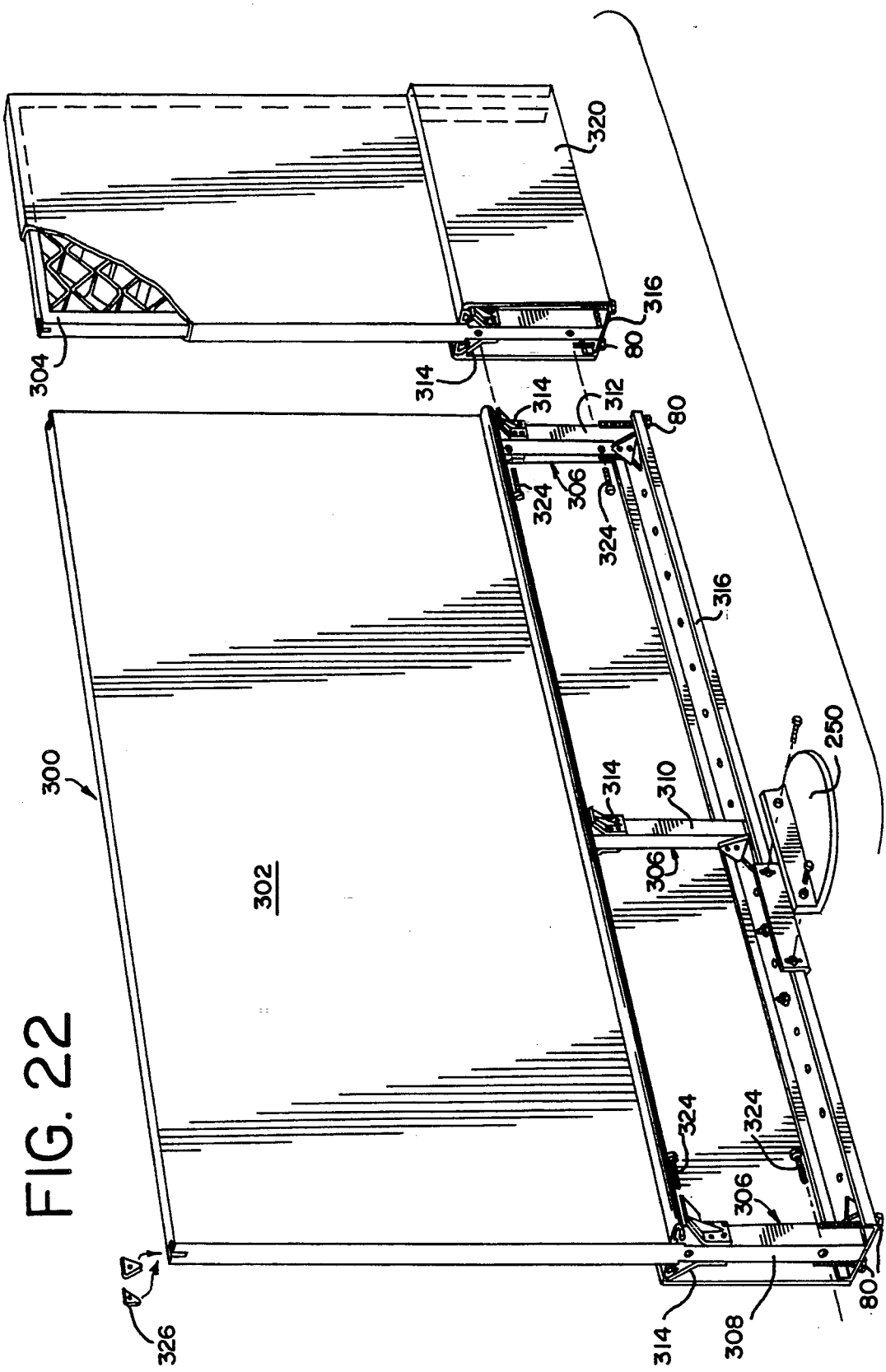
FIG. 22 is a perspective view of another embodiment of the present invention.

A yet further embodiment of the present invention is illustrated in FIG. 22. This embodiment of the present invention also provides for high capacity cabling distribution through an office space 22. According to the embodiment shown in FIG. 22, there is provided a unit 300. The unit 300 includes a screen portion 302. In a preferred embodiment, the screen portion 302 is a combination structure having screen frame members 304 to provide support for the screen portion 302. The frame members 304 extend generally around the perimeter of the screen portion 302. Extending from a lower side of the screen portion 302 are vertical stiles 306. The vertical stiles 306 preferably are formed of, or an extension of, the frame members 304. In the embodiment shown in FIG. 22, the unit 300 includes three vertical stiles 308, 310, and 312 that extend from the lower side of the screen portion 302. The vertical stiles 306 serve in part as a substitution of the frame 50 of the embodiment of the invention described above.

Attached to the vertical stiles 306 are upper brackets 314. Also attached to the vertical stiles 306 is a lower support bracket 316. A panel 320 may be attached to the vertical stiles 306 by means of the upper and lower brackets 314 and 316. In a preferred embodiment, the brackets 314 and 316 provide for attachment of the panel 320 so that it is spaced from the stiles 306. In a preferred embodiment, raceways (not shown) are attached to the vertical stiles 306 in a manner similar to the way that raceways are attached to the frame member 50 of the housing unit 34, described above.

In this embodiment, a foot 250 may be used to provide for stabilizing the unit 300. Also, adjacent units may be connected together serially by attaching adjacent frame members together. Attaching devices, such as bolts 324 may be provided for this purpose. The bolts 324 may be connected directly between the vertical stiles 306 of adjacent units. Alignment between adjacent units may be facilitated by alignment wedges 326 that may be inserted into slots in an upper side of the screen portions 302. In addition to connecting units 300 together in an end to end relationship, adjacent units may be connected together at right angles. This may be done in a manner similar to an end to end connection and it may include the provision of a corner member (not shown).

As in the prior embodiments, described above, this embodiment 300 of the present invention provides for high capacity cabling distribution through an office space 22. This embodiment also provides for the integral inclusion of privacy screen portions 302 which may be preferred in some applications to afford a degree of visual and auditory privacy. Note that in the embodiment of the present invention described above and illustrated in FIGS. 1-6, privacy screens may also be provided by means of screen devices 40 that are attachable to the housing units 34 and frame members 50 therein. With the embodiment of the present invention shown in FIG. 22, the privacy screen is included integrally with the unit. The embodiment shown in FIG. 22 is preferably compatible with the embodiments of the present invention described above and may be included, as preferred, in the same office space 22 as the other embodiments. In the embodiment shown in FIG. 22, note that a high degree of versatility is provided for the distribution of cabling because the areas 330 between adjacent vertical stiles, e.g. 308 and 310 are preferably left open to enable the passing of cabling from raceways on one side of the unit to the other side or out of the unit to service an office worker.

In a preferred embodiment, the screen portion may be formed of a wood fiber composite or honeycomb covered with wood, plastic, fiber, or synthetic skins. Of course, other material may be suitable and used.

Figure 23:
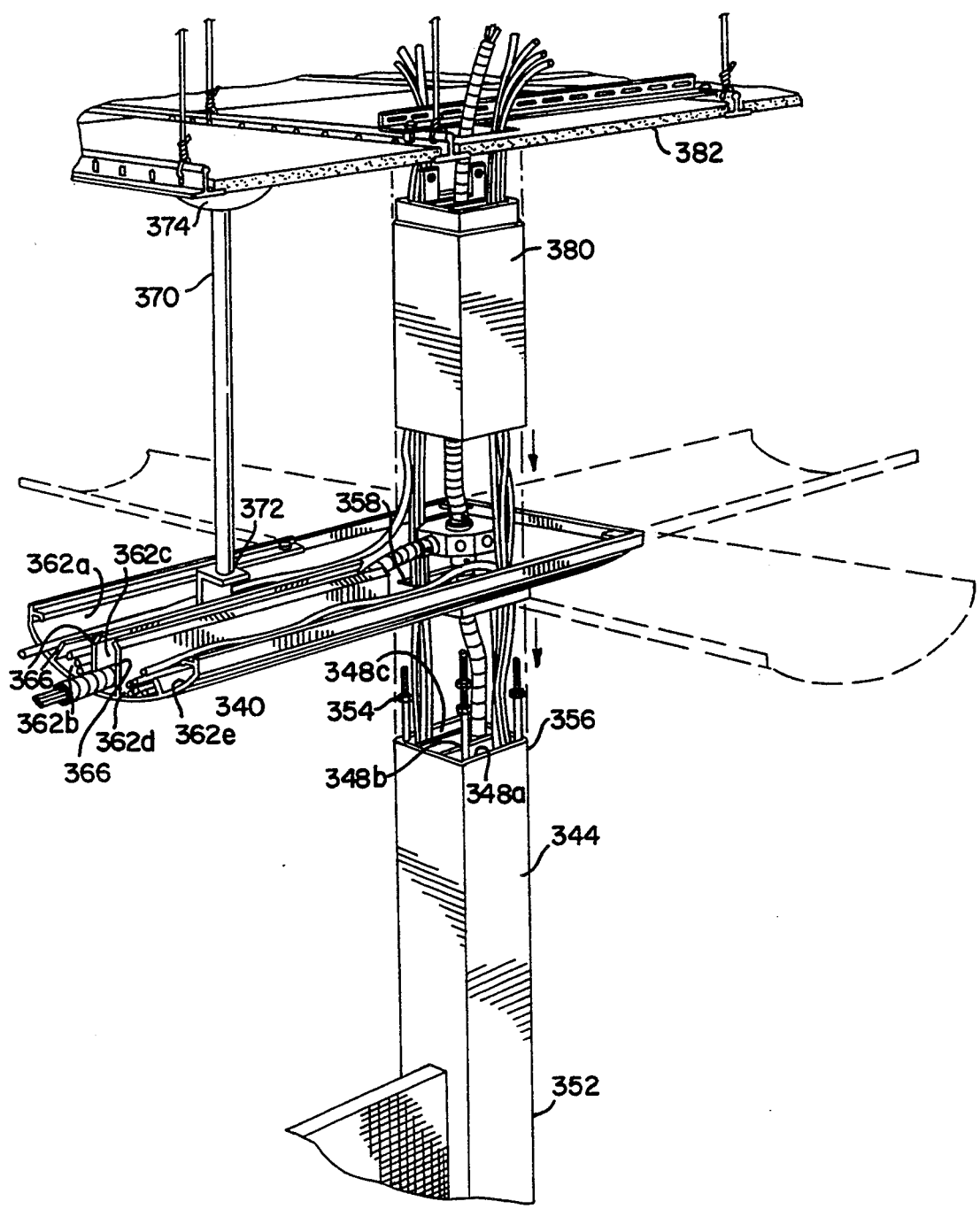
FIG. 23 is a perspective view of another aspect of the present invention.

Referring to FIG. 23, according to yet another aspect of the present invention, there is provided a flying lintel member 340. The flying lintel member 340 may be used to pass cabling over a walkway and therefor may be used as an alternative to the lintel member 44, described above. In addition, the flying lintel member 340 may be used in locations other than over walkways, such as along several office work places, or over open areas larger than just walkways.

The flying lintel member 340 may be used in conjunction with a vertical member 344. The vertical member 344 may be similar or identical to the vertical housing unit 46, described above. The vertical member 344 provides at least one internal passageway to allow for the distribution or passage of cabling from a housing unit 34 (not shown in FIG. 23) to the flying lintel member 340. In a preferred embodiment, the vertical member 344 includes more than one passageway, and preferably, the vertical member 344 includes at least three internal passageways 348a, 348b, and 348c to accommodate electrical, telephone, and power cabling in separate passageways. Additional cabling passageways may be provided, if desired, to provide for additional cabling capacity or to provide for isolation of certain types of cabling. In conjunction with this latter purpose, shielding may be incorporated into some or all of the passageways of the vertical member 344. In a preferred embodiment, cabling may be installed readily into and through the vertical member 344. For this purpose, the vertical member 344 may be provided so that one side 352 thereof is removable so that electrical, telephone, and data cabling may be readily installed into the vertical member 344.

The flying lintel member 340 connects to an upper end 356 of the vertical member 344. The flying lintel member 340 may be connected to the vertical member 344 by a suitable fastening means 354, such as nut and bolt combinations. The flying lintel member 340 includes an opening 358 through which cabling from the vertical member 344 may pass. In this embodiment, the flying lintel member 340 is a horizontally extending trough, open on an upper side thereof and having several horizontally extending channels 362a, 362b, 362c, 362d, and 362e, therein defined by partitions 366. The channels 362 preferably are open on the upper sides thereof so that cabling can be readily installed into the channels. Certain of these channels, e.g. 362c, may be specifically adapted to accommodate electrical cabling, and accordingly, may be provided with dimensions and shielding especially for that purpose. Other channels, e.g. 362a, 362b, 362d, and 362e, may be provided with dimensions and constructed in a manner suitable for telephone and data cabling.

The flying lintel member 340 may extend horizontally to connect to another vertical member (not shown), or may extend and connect to a wall of the building. Alternatively, the flying lintel member 344 may extend and connect to one or more other flying lintel members. For example, a flying lintel member section may extend to and terminate at another perpendicularly extending flying lintel member section, e.g. in a T-shaped, or L-shaped intersection. Alternatively, sections of flying lintel members may intersect in a four-way intersection. A four-way intersection of flying lintel members is illustrated in FIG. 23 in which three of the sections are shown in shadow.

Another optional feature that may be used in conjunction with the flying lintel member 344 is a hanger post 370. The hanger post 370 provides for supporting a section of the flying lintel member 340. Because the flying lintel member 340 may be used to span relatively long sections, e.g. greater than just a walkway, the flying lintel member 340 may require to be supported at one or more locations along its span. The hanger post 370 provides this function. The hanger post 370 attaches at a lower end 372 thereof to a section of the flying lintel member 340. The hanger post 370 attaches at an upper end 374 to a structural member which may be part of the building, part of a suspended ceiling, ceiling joists, etc. It is preferred that the connection of the flying lintel member 340 to the lower end 372 of the hanger post 370 should not interfere with the distribution of cabling. Accordingly, the connection between the hanger post 370 and the flying lintel member 340 should preferably not obstruct any of the channels 362 extending therein.

Another optional feature that may be used with the flying lintel 340 is an upper vertical section 380. The upper vertical section 380 allows for the distribution of cabling from the vertical member 344 and/or the flying lintel member 340 up to and above a suspended ceiling 382. The upper vertical section 380 may be similar in construction to the vertical member 344 although it may be provided in a different height in order to accommodate the height of the suspended ceiling 382. By providing access to the area above a suspended ceiling, the upper vertical member 382 allows the present system to be adapted to and provide additional cabling distribution capabilities for existing office systems that use the space above suspended ceilings for cabling distribution.

In the above described embodiment, the flying lintel member is described as having the form of a trough open on an upper side thereof. Alternatively, the flying lintel member may be provided as a closed passageway, preferably with at least one easily removable panel to accommodate installation of cabling therein.

Figure 24:
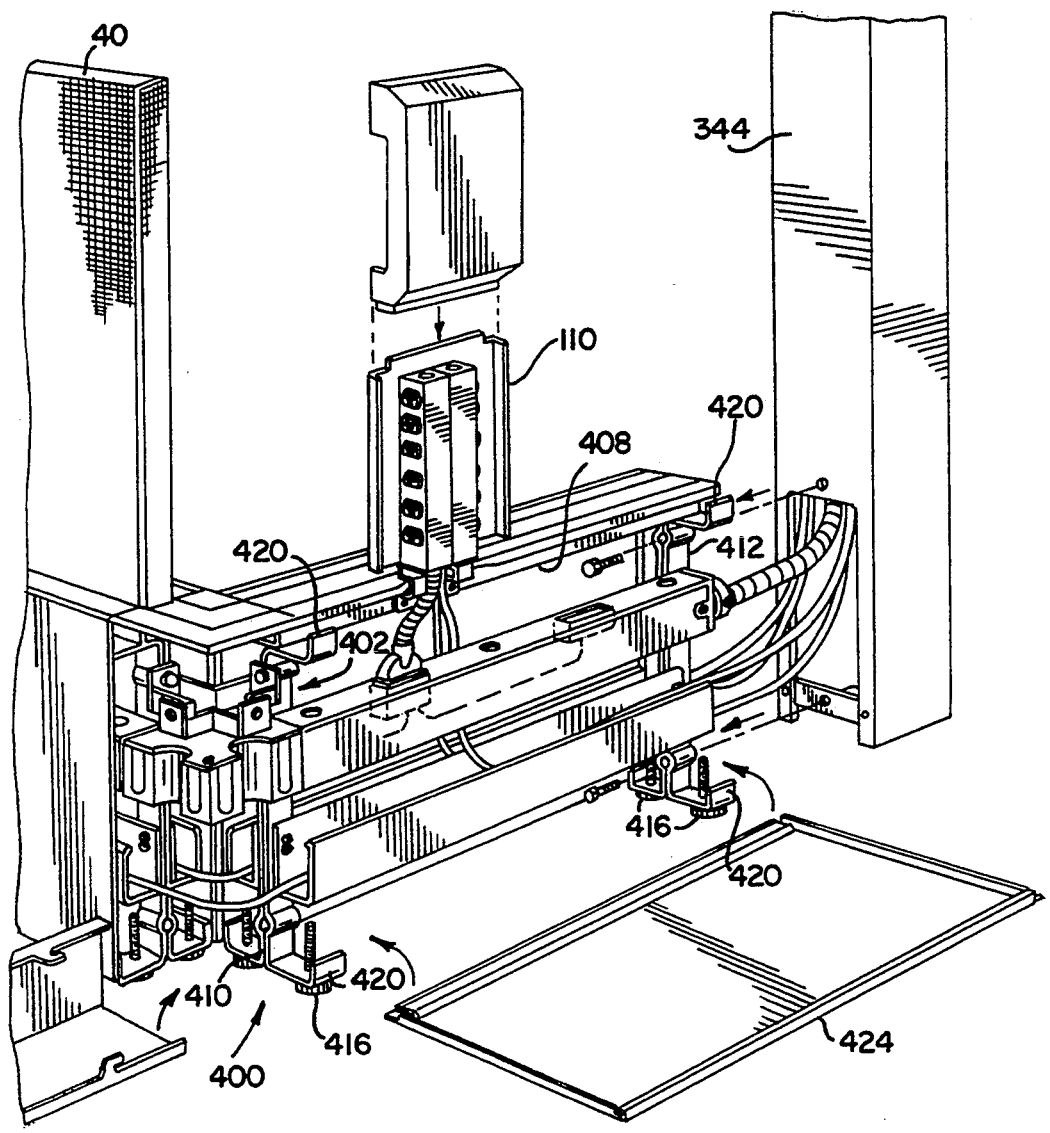
FIG. 24 is a perspective view of another embodiment of the present invention.
Figure 25:
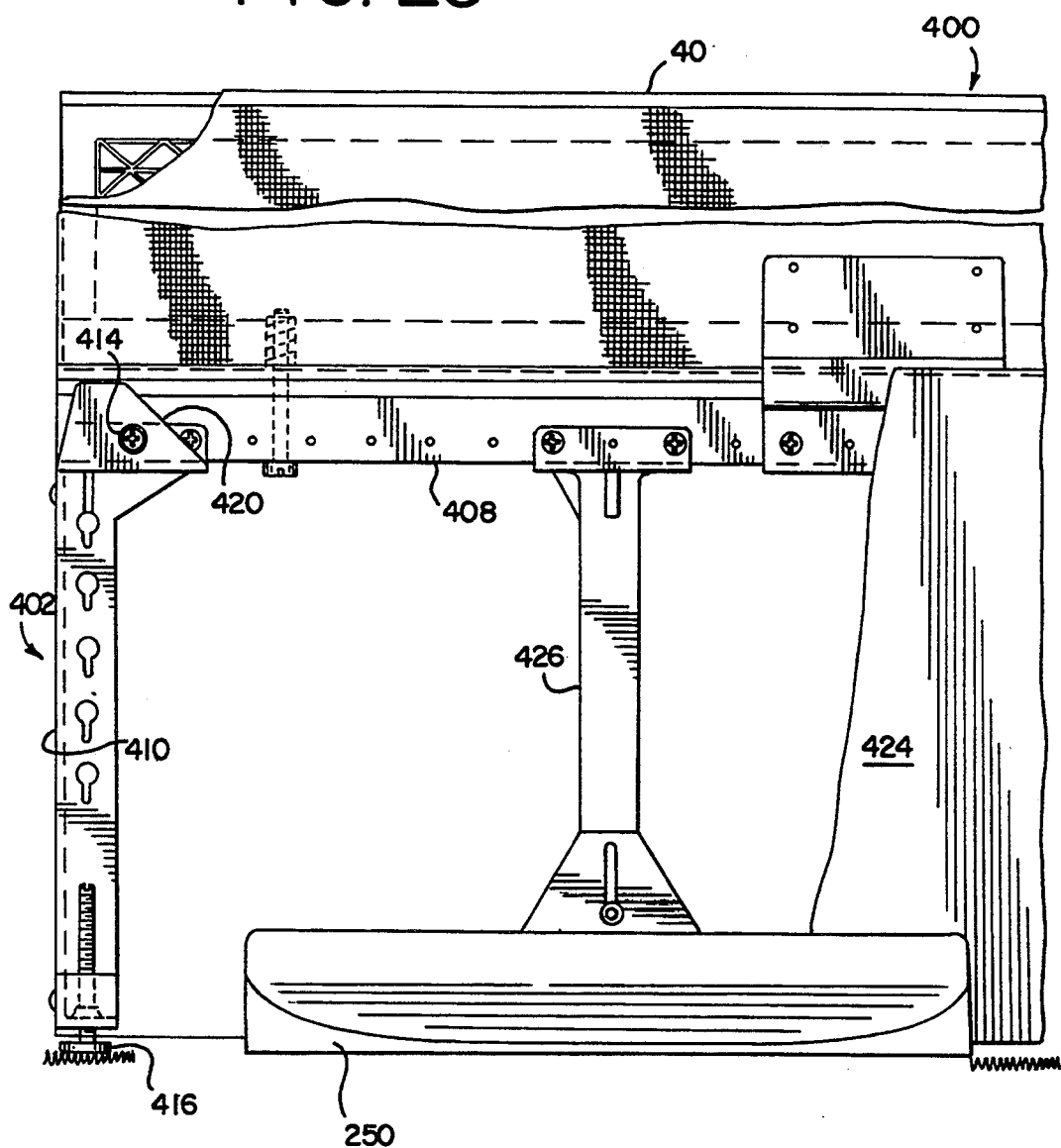
FIG. 25 is a side view of the embodiment of the present invention depicted in FIG. 24.

Referring to FIGS. 24 and 25, there is shown another embodiment of the present invention. In this embodiment, a housing unit 400 provides for horizontal cabling distribution and management, as in the embodiments described above. In this embodiment, the housing unit 400 includes a frame 402 made up of a horizontally extending frame member 408 and vertical members 410 and 412. The vertical members 410 and 412 connect to the horizontal member at corners 414. The vertical members 410 and 412 may include glides 416 to provide for leveling and height adjustment. Brackets 420 connect to and extend from the vertical members 410. The brackets 420 provide for attaching a panel 424 to the frame 402. The frame 402 may be provided in several horizontal sizes to meet the users' requirements, e.g. 2, 4, ... 12 foot segments. Where necessary, an intermediate support member 426 may be used. The intermediate support member 426 may be attached to the frame 402 at a location intermediate between the vertical members 410 and 412, as needed to provide for additional structural support to the housing unit 400. The intermediate support member 426 may be used with a support foot 250, such as described above.

As in the other embodiments, the housing unit 400 may be used with user access boxes 110, vertical members 344, raceways 102 and 104, and privacy screens 40.

It is a particular advantage of this embodiment of the housing unit 400 that the frame 402 is optimized to provide a maximum of access from a lower side thereof. Compared to the previously described embodiments, this embodiment of the frame 402 has no horizontally extending structural member along the lower side thereof. The connection between vertical members 410 and 412 is made by means of the horizontal member 408 which is located along the upper side of the frame 402. This provides substantially the entire lower side of the housing unit 400 for cabling access, such as from floor monuments provided by the architectural systems of the building. Also, because the entire lower side between vertical members 410 and 412 is open, considerable flexibility is provided in terms of locating the housing unit 400 to fit over a floor monument that provides cabling access.

A further aspect of the present invention involves a method for constructing an office furniture system for cabling management. Referring again to FIGS. 1, 2 and 3, this method utilizes modular components, as described above, specifically adapted for installation and assembly in discrete stages to provide for an office furniture design that can be built with convenience and efficiency.

FIGS. 1, 2 and 3 show, in several stages of assembly, an office furniture system according to this aspect of the present invention. As a first step, frame units 50 are provided. The frame units 50 are provided with the necessary hardware for making all the connections between the frame units. The frame units 50 are designed and adapted so that all the frames can be completely assembled and connected to each other to forming the basis for cabling distribution and management system prior to the installation of the cabling or finishing components. Included at this stage are the lintels 44, vertical housing units 46 and underpass units 48. Also included at this stage are the raceways 102, 104, and 106 into which the electrical, telephone, and date cabling can be installed.

After the frames, vertical members, lintels, and underpass units are fully constructed, the electrical cabling can be distributed. This is done by laying in the electrical cabling from the utility closet 26 in the first raceways 102 that are mounted on the frames. At this stage, the power outlets may also be provided at appropriate locations along the frames. The electrical power cabling can be completely installed at this stage. The locations at which the power outlets may be provided are completely variable and can be determined by the office system designer.

The next stage involves installing the communications cabling. The communications cabling will also typically be provided from the utility closet 26 or other communications node. This communications cabling is provided in the second raceway 104 connected to the frame members 50. The appropriate communications cabling jacks may also be provided at the appropriate locations. The communications cabling can be completely installed at this stage. The locations at which the communications outlets may be provided are completely variable and can be determined by the office system designer.

Next, the data cabling is distributed. The data cabling is also provided or may be provided from the utility closet 26 in the third raceway 106. The data cabling distribution may be fully provided in this step. The locations at which the data cabling outlets may be provided are completely variable and can be determined by the office system designer.

After the electrical, telephone and data cabling has been fully installed, the side panel covers 150 are put in place. At this point, the cabling distribution is complete and ready to use. Additional accessories like privacy screens 40 may be installed at this time. Desks, chairs, file cabinets and other office furniture equipment and accessories may be brought in, as illustrated in FIG. 3.

The procedure described above departs from what was done in prior office system designs. In prior office designs, the provision for cabling installation and distribution was not separated from the mechanical assembly of the furniture and screens, etc. In prior methods of installation, skilled tradesmen required for parts of the installation, e.g. the electrical distribution, would be brought in to do only a portion of their work and would have to return later to finish it. With the present embodiment, each skilled trades' work can be segregated and completed in discrete stages without interfering with the work of other trades.

This method of assembly provides significant advantages for the rapid and efficient construction of office floor space.

Figures 26, 27:
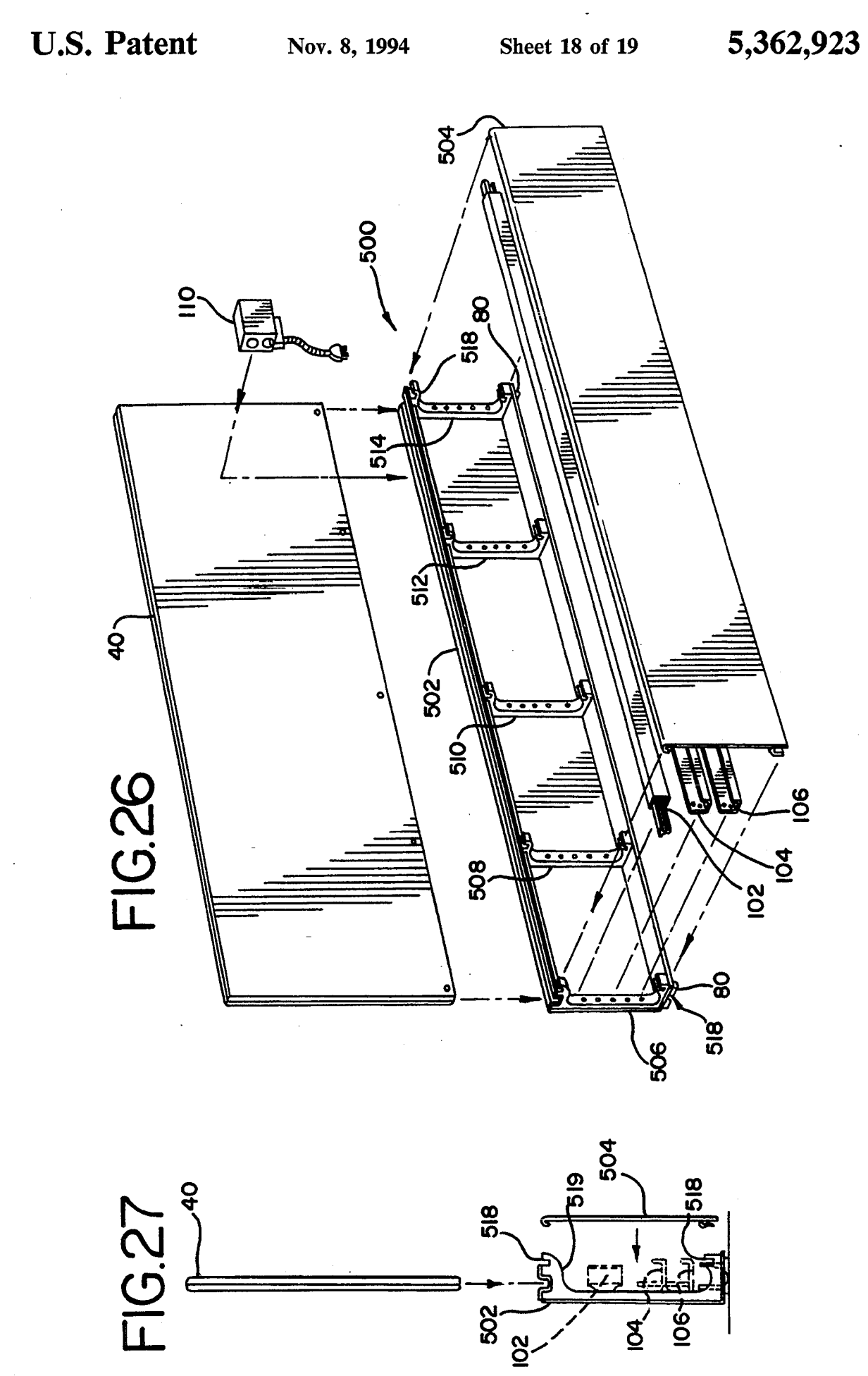

Referring to FIG. 26, there is depicted another embodiment of the present invention. In this embodiment, a free-standing horizontal cable housing unit 500 is used for the horizontal distribution of cabling such as electrical, telephone, and data cabling within and through a workspace. The cable housing unit 500 is similar to the housing unit 34 described above. Like the previously described cable housing unit, the cable housing unit 500 of this embodiment may include a plurality of raceways 102, 104, and 106 for the distribution of electrical, telephone, and data cabling. Further, the horizontal cable housing unit 500 of this embodiment may be used with privacy screen members 40, lintel members 44, vertical housing units 46, underpass units 48, user access boxes 110, as well as all the other features and components previously described in connection with the above embodiments. As in the other embodiments, the housing unit 500 is preferably less than about 30 inches in height.

The embodiment of the horizontal housing unit 500 differs from the above described housing units in that a first sidewall 502 of the housing unit 500 is not removable. The other sidewall 504, opposite from the first sidewall 502, is removable. In a preferred embodiment, the first sidewall is made of steel that is unrolled and formed into a C-shape. The C-shaped first sidewall may be open at the bottom as in the previous embodiments. The first sidewall 502 is preferably structural in character and construction, i.e. the first sidewall is structurally capable of maintaining itself in an upright configuration and carrying cabling, raceways, access boxes, and other components necesary for the distribution of cabling through the workspace. Because the first sidewall is structural in character, it obviates the need for internal frame members, such as frame 50 of the previous embodiment.

To provide for attachment of the second sidewall, raceways, etc., and possibly to add further structural support, one or more stud members 506, 508, 510, 512, and 514 are attached to the first sidewall 502. The stud members include releasable fastening devices 518, such as clips, so as to provide for releasable attachment of the second sidewall 504 to the first sidewall 502. The stud members may include projecting portions 519 for attachment thereto of the second sidewall 504. Because the first sidewall 502 is intended to provide structural support for the housing unit 500, the stud members 506–514 need not be connected to each other. The stud members may be uniform pieces of structural material, such as steel, and are sized and shaped to conform to the inside surface of the first sidewall 502. Except for the projecting portions 519, the stud members are spaced from the second sidewall 504 so as to maintain the substantially unobstructed continuous hollow interior of the housing unit 500 for the installation and distribution of cabling or raceways.

The raceways 102, 104, 106 may be attached to the stud members 506–514. Similarly, a privacy screen 40 may be attached either directly to the C-shaped first sidewall 502 or may also be attached to the stud members. A top cover 60 may be installed to the top side of the C-shaped first sidewall 502 and the privacy screen 40 may be mounted therein by means of fasteners 520, such as threaded nuts and bolts. To facilitate distributing cabling from the interior of the housing unit 500 to worker stations located adjacent thereto, there are preferably a series of openings 521 located in the first sidewall 502 preferably along the top side thereof.

Referring to FIG. 29, there is illustrated an assembly process for the housing unit embodiment 500 shown in FIGS. 26 to 28. A roll of steel 526 is laid out and cut to the length of the housing unit 500. This length of steel is used for the first sidewall 502. This length may be typically up to 96 inches although other lengths may be chosen. The length may be determined to be regular sizes or multiples of regular sizes, such as 24 inches, 36 inches, 48 inches, 72 inches, etc. Alternatively, the length of the housing unit 500 need not be limited to regular sizes. The ability of this embodiment to be provided in irregular sizes follows because this embodiment does not rely on a regular sized internal frame member. Thus, the length of this embodiment may be chosen to any suitable length, i.e. custom designed.

After the sidewall 502 is cut to the appropriate length, the stud members are affixed thereto. This may be done by welding, fasteners, adhesives, or other suitable processes. Other necessary components may be installed at this time as appropriate, such as the anchors 250, glides 80, raceways, and user access boxes 110, as in the other embodiments.

The second sidewall 504 may also be provided from a roll of material 527. Like the first sidewall 502, the second sidewall 504 is unrolled and then cut to the appropriate length and formed into the desired shape. The second sidewall 504 is removable from the housing unit 500 and may be provided with hooks 530 and 532 which may be formed of the material of the sidewall 504 or which may be attached thereto. The hooks allow for releasable attachment to either the first sidewall 502 or to the stud members. The second sidewall 504 may be made of steel or of a suitable plastic material. If made of steel, the second sidewall may be made of a lighter gauge steel than the first sidewall 502 to facilitate removal of the second sidewall 504 to provide ready access to the interior of the housing unit 500. Further, since the second sidewall 504 preferably does not provide structural support for the housing unit 500, it may be provided in a lighter gauge. A base molding or kickguard 531 may then be attached to the first and second sidewalls. The base molding 531 is preferably a plastic material such as a polycarbonate and is affixed along the lower edge of the exterior of the sidewalls by adhesives, fasteners, or other means. Corner connection members and end members similar to those described above with respect to the other embodiments may also be employed.

The housing unit 500 provides similar advantages as the above described embodiment of the housing unit 34. The housing unit 500 provides a relatively large horizontally extending passageway or chamber into which cabling can be distributed through a work space. Raceways may be readily installed in the housing unit 500 to contain electrical, telephone, and data cabling. The interior passageway defined by the housing unit 500 is readily accessible for installing or modifying cabling by means of the removable sidewall 504. This is further enhanced due to the reason that the housing unit 500 is specifically not designed for attachment of furniture thereto, such as desks, cabinets, and the like. Thus, by removal of the sidewall 504, ready access to the interior of the unit is provided.

It is noted that the interior of the housing unit 500 is accessible from one side only, i.e. via removal of sidewall 504, and that access to the interior is not provided from the other side because the sidewall 502 is not removable. Although this factor may make the interior of housing unit 500 somewhat less accessible compared to the embodiment of the housing unit 34 shown in FIG. 4, the housing unit 500 still provides a very high degree of accessibility. For example, with the housing unit 500, the ability to remove an entire side, e.g. sidewall 504, will in most situations provide more than sufficient access to allow for distribution and redistribution of cabling. Moreover, the embodiment of the housing unit 500 may provide additional advantages in terms of manufacturing, materials cost, and construction. The embodiment of the housing unit 500 may possess advantages because it includes fewer parts, for example, compared to the embodiment of the housing unit 34.

It is intended that the foregoing detailed description be regarded as illustrative rather than limiting and that it is understood that the following claims including all equivalents are intended to define the scope of the invention.

We claim:

1. A furniture system for distributing and managing cabling and assist facility space planning through a work space comprising:
    a plurality of free-standing horizontal cable housing units aligned end to end, either in a straight line or at an angle, each of said housing units comprising:
        a top, and two sidewall means defining a hollow chamber open at both ends, with at least one of said sidewall means being easily demountable to provide access to the hollow chamber of the housing unit;
        a first raceway mounted within said hollow chamber, wherein said first raceway runs the length of said housing unit and is adapted to house electrical power cables;
        a second raceway mounted within said housing unit, wherein said second raceway runs the length of said housing unit and is adapted to house communication cables;
    vertical housing units; and
    lintel housing units;
    said vertical housing units and said lintel housing units adapted to pass cabling over a doorway in the work space.

2. The system of claim 1 wherein at least some of said horizontal housing units include a third raceway mounted to the frames of said horizontal cable housing units adapted to house data cables.

3. The system of claim 1 further comprising screens mounted atop at least some of the horizontal cable housing units to divide the work space.

4. The system of claim 1 wherein at least some of said horizontal cable housing units further comprise user access means comprising electrical outlet means and communication cable jacks, said user access means being located outside of said sidewalls and further comprising cover means for covering said electrical outlet means and said communication cable jacks while allowing power cable and communication cables to pass out of the cover means.

5. The system of claim 1 wherein at least some of the horizontal cable housing units are mounted to a building wall.

6. A furniture system for distributing and managing cabling through a work space comprising:
    a plurality of free-standing horizontal cable housing units aligned end to end, either in a straight line or at an angle, each of said units comprising:
        a frame comprising a top, and at least two vertical members passing between a base and top;
        a first raceway mounted within said frame, wherein said first raceway runs the length of said frame and is adapted to house electrical power cables;
        a second race way mounted within said frame, wherein said second raceway runs the length of said frame and is adapted to house communication cables;
        sidewalls mounted to said frame so as to cover said raceways, the sidewall which is mounted on at least one side of said frame being easily demountable to provide access to the first and second raceways; and
        connection posts for joining at least two horizontal cable housing units.

7. The system of claim 6 wherein said connection posts comprise junction means for connecting the power cables housed in one of said two horizontal cable housing units to the power cables housed in the other of said two horizontal cable housing units.

8. The system of claim 6 wherein at least some of said horizontal cable housing units include local distribution frames for said communication cables.

9. A furniture system for distributing and managing cabling through a work space comprising:
    a plurality of free-standing horizontal cable housing units aligned end to end, either in a straight line or at an angle, each of said units comprising:
        a frame comprising a top, and at least two vertical members passing between a base and top;
        a first raceway mounted within said frame, wherein said first raceway runs the length of said frame and is adapted to house electrical power cables;
        a second raceway mounted within said frame, wherein said second raceway runs the length of said frame and is adapted to house communication cables; and
        sidewalls mounted to said frame so as to cover said raceways, the sidewall which is mounted on at least one side of said frame being easily demountable to provide access to the first and second raceways; and wherein at least some of said horizontal cable housing units further comprise user access means comprising electrical outlet means and communication cable jacks, said user access means being located outside of said sidewalls and further comprising cover means for covering said electrical outlet means and said communication cable jacks while allowing power cable and communication cables to pass out of the cover means.

10. The system of claim 9 wherein the user access means comprises a box protruding up from the horizontal housing units and wherein said box is hinged to allow opening of at least one side to thereby provide access to the outlets and jacks within.

11. A furniture system for distributing and managing cabling through a work space comprising:
a plurality of free-standing horizontal cable housing units aligned end to end either in a straight line or at an angle, each of said units comprising:
a frame comprising a top, at least two vertical members passing between a base and top;
a first raceway mounted within said frame, wherein said first raceway runs the length of said frame and is adapted to house electrical power cables;
a second raceway mounted within said frame, wherein said second raceway runs the length of said frame and is adapted to house communication cables;
sidewalls mounted to said frame so as to cover said raceways, the sidewall which is mounted on at least one side of said frame being easily demountable to provide access to the first and second raceways; and vertical housing units and lintel housing units for passing said cabling over a doorway in the work space.

12. A furniture system for distributing and managing cabling through a work space comprising:
a plurality of free-standing horizontal cable housing units aligned end to end, either in a straight line or at an angle, each of said units comprising:
a frame comprising a top, and at least two vertical members passing between a base and top;
a first raceway mounted within said frame, wherein said first raceway runs the length of said frame and is adapted to house electrical power cables;
a second raceway mounted within said frame, wherein said second raceway runs the length of said frame and is adapted to house communication cables;
sidewalls mounted to said frame so as to cover said raceways, the sidewall which is mounted on at least one side of said frame being easily demountable to provide access to the first and second raceways; and screens mounted atop at least some of the horizontal cable housing units to divide the work space.

13. A furniture system for distributing and managing cabling through a work space comprising:
a plurality of free-standing horizontal cable housing units aligned end to end, either in a straight line or at an angle, each of said units comprising:
a frame comprising a top, and at least two vertical members passing between a base and top;
a first raceway mounted within said frame, wherein said first raceway runs the length of said frame and is adapted to house electrical power cables;
a second raceway mounted within said frame, wherein said second raceway runs the length of said frame and is adapted to house communication cables; and
sidewalls mounted to said frame so as to cover said raceways, the sidewall which is mounted on at least one side of said frame being easily demountable to provide access to the first and second raceways; and further wherein the horizontal cable housing units are no more than about 30 inches tall.

14. The system of claim 13 further comprising brackets on said vertical members for mounting the sidewalls to the frames.

15. The system of claim 13 wherein at least some of said horizontal housing units include a third raceway mounted to the frames of said horizontal cable housing units adapted to house data cables.

16. A furniture system for distributing and managing cabling through a work space comprising:
a plurality of free-sliding horizontal cable housing units aligned end to end, either in a straight line or at an angle, each of said units comprising:
a frame comprising a top, and at least two vertical members passing between a base and top;
a first raceway mounted within said frame, wherein said first raceway runs the length of said frame and is adapted to house electrical power cables;
a second raceway mounted within said frame, wherein said second raceway runs the length of said frame and is adapted to house communication cables;
sidewalls mounted to said frame so as to cover said raceways, the sidewall which is mounted on at least one side of said frame being easily demountable to provide access to the first and second raceways; and wherein the first raceway comprises a channel which is closed on all four sides and wherein at least one side of the channel is openable.

17. The system of claim 16 wherein the second raceway comprises an open tray.

18. A furniture system for distributing and managing cabling through a work space comprising:
a plurality of free-standing horizontal cable housing units aligned end to end, either in a straight line or at an angle, each of said units comprising;
a frame comprising a top, and at least two vertical members passing between a base and top:
a first raceway mounted within said frame, wherein said first raceway runs the length of said frame and is adapted to house electrical power cables;
a second raceway mounted within said frame, wherein said second raceway rims the length of said frame and is adapted to house communication cables; and
sidewalls mounted to said frame so as to cover said raceways, the sidewall which is mounted on at least one side of said frame being easily demountable to provide access to the first and second raceways; and further wherein at least some of the horizontal cable housing units are mounted to a building wall.

19. A furniture system for distributing and managing cabling through a work space comprising:
a plurality of free-standing horizontal cable housing units aligned end to end, either in a straight line or at an angle, each of said units comprising:
a frame comprising a base, a top, and at least two vertical members passing between the base and top;

a first raceway mounted within said frame, wherein said first raceway runs the length of said frame and is adapted to house electrical power cables;

a second raceway mounted within said frame, wherein said second raceway runs the length of said frame and is adapted to house communication cables;

sidewalls mounted to said frame so as to cover said raceways, the sidewall which is mounted on at least one side of said frame being easily demountable to provide access to the first and second raceways;

vertical housing units; and lintel housing units;

said vertical housing units and said lintel housing units adapted to pass cabling over a doorway in the work space.

20. A furniture system for distributing and managing cabling through a work space comprising:

a plurality of free-standing horizontal cable housing units joined either in a straight line or at angles, each of said units comprising:

a frame comprising a plurality of rectangular frame sub-units, said sub-units being joined end to end to form a frame, each of said sub-units including a generally open mid-section;

a first raceway mounted to said frame, wherein said first raceway runs the length of said frame and is adapted to house electrical power cables;

a second raceway mounted within said frame, wherein said second raceway runs the length of said frame and is adapted to house communication cables; and sidewalls mounted to said frame so as to cover said raceways, with a sidewall mounted on one side of said frame being easily demountable to provide access to the first and second raceways.

21. The system of claim 20 wherein each of said rectangular frame sub-units includes a foot upon which the sub-unit rests.

22. The system of claim 20 wherein at least some of said horizontal cable housing units include local distribution frames for said communication cables.

23. The system of claim 20 wherein each rectangular frame sub-unit includes attachment means for attaching two rectangular frame sub-units together end to end.

24. The system of claim 23 wherein the locking means comprise holes in the rectangular frame sub-units adjacent to each end of the rectangular frame sub-units together with bridging means with protrusions insertable into the holes of adjacent rectangular frame sub-units.

25. The system of claim 24 wherein the locking means comprise bridging means with holes together with protrusions on the rectangular frame sub-units adjacent to each end of the rectangular frame sub-units which are protrusions are insertable into the holes of the bridging means.

26. The system of claim 20 wherein each of the rectangular frame sub-units comprises a horizontal top member, a horizontal bottom member, a vertical first end member, and a vertical second end member.

27. The system of claim 20 further comprising brackets on said first and second vertical end members of the rectangular frame sub-units for mounting the sidewalls to the frames.

28. The system of claim 20 wherein each rectangular frame sub-unit has a common width, a common height, and a common length.

29. The system of claim 20 wherein at least some of said horizontal housing units include a third raceway adapted to house data cables mounted to the frames of said horizontal cable housing units.

30. The system of claim 20 further comprising connection posts for joining at least two horizontal cable housing units.

31. The system of claim 30 wherein said connection post comprises junction means for connecting the power cables housed in one of said two horizontal cable housing units to the power cables housed in the other of said two horizontal cable housing units.

32. The system of claim 20 wherein at least some of said horizontal cable housing units further comprise user access means comprising electrical outlet means and communication cable jacks, said user access means being located outside of said sidewalls and further comprising cover means for covering said electrical outlet means and said communication cable jacks while allowing power cable and communication cables to pass out of the cover means.

33. The system of claim 32 wherein the user access means comprises a box protruding up from the horizontal housing units and wherein said box is hinged to allow opening of at least one side to thereby provide access to the outlets and jacks within.

34. The system of claim 20 further comprising screens mounted atop the horizontal cable housing units to divide the work space.

35. The system of claim 34 in which the screens are integral with the horizontal cable housing units.

36. The system of claim 20 wherein the horizontal cable housing units are no more than about 30 inches tall.

37. The system of claim 20 wherein the first raceway comprises a channel which is closed on all four sides and wherein at least one side of the channel is openable.

38. The system of claim 20 wherein the second raceway comprises an open tray.

39. The system of claim 20 wherein at least some of the horizontal cable housing units are mounted to a building wall.

40. A furniture system for distributing and managing cabling through a work space comprising:

a plurality of free-standing horizontal cable housing units joined either in a straight line or at angles, each of said units comprising:

a frame comprising a plurality of rectangular frame sub-units, said sub-units being joined end to end to form a frame, each of said sub-units including a horizontal top member, a horizontal bottom member, a first vertical end member, and a second vertical end member, and each of said sub-units further having a generally open mid-section;

a first raceway mounted to said frame, wherein said first raceway runs the length of said frame, is adapted to house electrical power cables, is a channel closed on all four side and open at each end, and is openable on one of its sides;

a second raceway mounted within said frame, wherein said second raceway runs the length of said frame and is adapted to house communication cables;

a third raceway mounted within said frame, wherein said third raceway runs the length of said frame and is adapted to house data cables; and sidewalls mounted to said frame so as to cover said raceways, each of said sidewalls being easily demountable to provide access to the first and second raceways.

41. The system of claim 40 wherein at least some of said horizontal cable housing units further comprise user access means comprising electrical outlet means and communication cable jacks, said user access means being located outside of said sidewalls and further comprising cover means for covering said electrical outlet means and said communication cable jacks while allowing power cable and communication cables to pass out of the cover means.

42. The system of claim 40 wherein at least some of the horizontal cable housing units are mounted to a building wall.

43. A furniture system for distributing and managing cabling through a work space comprising:

a plurality of free-standing horizontal cable housing units aligned end to end, either in a straight line or at an angle, each of said housing units comprising:

a top, a bottom, and two sidewall means defining a hollow chamber open at both ends, with at least one of said sidewall means being easily demountable to provide access to the hollow chamber of the housing unit;

a first raceway mounted within said hollow chamber, wherein said first raceway runs the length of said housing unit and is adapted to house electrical power cables;

a second raceway mounted within said housing unit, wherein said second raceway runs the length of said housing unit and is adapted to house communication cables; and underpass units for connecting two free-standing horizontal cable housing units separated by a walkway and adapted to pass cabling under the walkway in the work space.

44. An furniture system for distributing and managing cabling through a work space comprising:

a plurality of free-standing horizontal cable housing units aligned end to end, either in a straight line or at an angle, each of said housing units comprising:

a top, and two sidewall means defining a hollow chamber open at both ends, with at least one of said sidewall means being easily demountable to provide access to the hollow chamber of the housing unit;

a first raceway mounted within said hollow chamber, wherein said first raceway runs the length of said housing unit and is adapted to house electrical power cables;

a second raceway mounted within said housing unit, wherein said second raceway runs the length of said housing unit and is adapted to house communication cables;

vertical members connected to at least one of the housing units, each of said vertical members having at least one passageway therein for the distribution of cabling from a housing unit connected thereto; and a flying lintel member connected to at least one vertical member, said flying lintel member having at least one passageway located therein for the passage of cabling in the flying lintel member horizontally in the work space from the connection between the flying lintel member and the vertical member.

45. The system of claim 44 further including a support post connected at a lower end thereof to a flying lintel member and connected at an upper end thereof to a portion of the structure of the building.

46. The system of claim 44 further including an upper vertical member having at least one passageway therein for the distribution of cabling from a flying lintel member upward to an area above a suspended ceiling of the building.

47. A method of providing electrical power and communications cabling to a work space comprising the steps of:

providing a plurality of horizontal frames, each of said frames comprising a first raceway adapted to house electrical power cabling and a second raceway adapted to house communications cabling, at least one of said frames being adjacent a source of electrical power, and at least one of said frames being adjacent a communications node, said horizontal frames being joined end to end, either in a straight line, or at an angle in a desired configuration;

providing electrical power cabling connected to and extending from said source of electrical power;

laying said electrical power cabling in the first raceways of said horizontal frames;

providing electrical power outlets at desired points along said horizontal frames;

providing communications cabling connected to and extending from the communications node;

laying said communications cabling in the second raceways of said horizontal frames;

providing communications cabling jacks at desired points along said horizontal frames;

attaching sidewalls to said horizontal frames to thereby cover the first and second raceways; and attaching screens atop the horizontal frames to thereby divide the work space.

48. The method of claim 47 wherein the horizontal frames further comprise a third raceway adapted to house data cabling, and further comprising the steps of providing data cabling and laying said data cabling in the third raceway before the sidewalls are attached.

49. A method of furnishing a work space including the provision of electrical power and communications cabling to the work space comprising the steps of:

providing a plurality of horizontal frames, each of said frames comprising a first raceway adapted to house electrical power cabling and a second raceway adapted to house communications cabling, at least one of said frames being adjacent a source of electrical power, and at least one of said frames being adjacent a communications node, said horizontal frames being joined end to end, either in a straight line, or at an angle in a desired configuration;

providing electrical power cabling connected to and extending from said source of electrical power;

laying said electrical power cabling in the first raceways of said horizontal frames;

providing electrical power outlets at desired points along said horizontal frames;

providing communications cabling connected to and extending from the communications node;

laying said communications cabling in the second raceways of said horizontal frames;

providing communications cabling jacks at desired points along said horizontal frames;

attaching sidewalls to said horizontal frames to thereby cover the first and second raceways;

installing work surfaces, storage units, desks, furniture, file cabinets or other work tools in an array around the configuration of horizontal frames; and attaching screens atop the horizontal frames to thereby divide the work space.

50. The method of claim 49 wherein the horizontal frames further comprise a third raceway adapted to house data cabling, and further comprising the steps of providing data cabling and laying said data cabling in the third raceway before the sidewalls are attached.

51. A furniture system for distributing and managing cabling and to assist facility space planning through a work space comprising:

a plurality of free-standing horizontal cable housing units aligned end to end, either in a straight line or at an angle, wherein each of said housing units defines a continuous, horizontally extending passageway for the distribution of cabling therein, each of said housing units comprising:

a first housing unit member comprising a non-removable sidewall and a top side; and a second housing unit member comprising a removable sidewall removably connected to said first housing unit member;

a first raceway mounted within said passageway of said housing unit, wherein said first raceway runs the length of said housing unit and is adapted to house electrical power cables; and a second raceway mounted within the passageway of said housing unit, wherein said second raceway runs the length of said housing unit and is adapted to house communication cables.

52. The furniture system of claim 51 in which said first housing unit member further comprises:

stud members located within the passageway of the housing unit and connected to the first sidewall.

53. The furniture system of claim 51 in which said first housing unit member is composed of a structural material.

54. The furniture system of claim 51 in which the first housing unit member is formed into a C-shape.

55. The furniture system of claim 51 further comprising:

vertical housing units; and lintel housing units;

said vertical housing units and said lintel housing units adapted to pass cabling over a doorway in the work space.

56. The furniture system of claim 51 wherein at least some of said horizontal housing units include:

a third raceway mounted to said first housing unit member of the horizontal cable housing unit and adapted to house data cables.

57. The furniture system of claim 51 wherein at least some of said horizontal cable housing units further comprise user access means comprising electrical outlet means and communication cable jacks, said user access means being located outside of said first and second housing unit members and further comprising cover means for covering said electrical outlet means and said communication cable jacks while allowing power cable and communication cables to pass out of the cover means.

58. The furniture system of claim 51 wherein the horizontal cable housing units are no more than about 30 inches tall.

59. A furniture system for distributing and managing cabling and assisting facility space planning through a work space comprising:

a plurality of uniform, free-standing horizontal cable housing units adapted to be arranged in alignment end to end, either in a straight line or at an angle, wherein at least some of said housing units include first and second horizontally extending sides and a top side defining a continuous horizontally extending passageway for the distribution of cabling therethrough;

said first side comprising a continuous non-removable wall member having stud members connected thereto; and said second side comprising a wall member removably connected to said stud members;

a first raceway mounted within said passageway of said housing unit, wherein said first raceway runs the length of said housing unit and is adapted to house electrical power cables;

a second raceway mounted within the passageway of said housing unit, wherein said second raceway runs the length of said housing unit and is adapted to house communication cables;

said housing unit having access openings to permit passage of cabling from said passageway to an area outside adjacent said housing unit.

* * * * *

UNITED STATES PATENT AND TRADEMARK OFFICE
CERTIFICATE OF CORRECTION

PATENT NO. : 5,362,923
DATED : November 8, 1994
INVENTOR(S) : Thomas J. Newhouse et al.   Page 1 of 2

It is certified that error appears in the above-indentified patent and that said Letters Patent is hereby corrected as shown below:

<u>On The Title Page</u>, item [56]:

In column 2, line 1, delete "Ryberg" and substitute --Ryburg--.

Col. 19:
In claim 1, line 2, after "and" insert --to--.
Col. 20:
In claim 4, line 8, delete "cable" and substitute --cables--.

In claim 6, line 11, delete "race way" and substitute --raceway--.
Col. 21:
In claim 11, line 6, after "top," insert --and--.
Col. 22:
In claim 16, line 3, delete "free-sliding" and substitute --free-standing--.

In claim 18, line 7, delete ":" and substitute --;--.
Col. 23:
In claim 25, line 4, delete "are".
Col. 24:
In claim 32, line 8, delete "cable" and substitute --cables--.

In claim 40, line 17, delete "side" and substitute --sides--.

UNITED STATES PATENT AND TRADEMARK OFFICE
CERTIFICATE OF CORRECTION

PATENT NO. : 5,362,923
DATED : November 8, 1994
INVENTOR(S) : Thomas J. Newhouse et al.

It is certified that error appears in the above-indentified patent and that said Letters Patent is hereby corrected as shown below:

Col. 25:

In Claim 44, line 1, delete "An" and substitute --A--.

Col. 28:

In claim 57, line 8, delete the second occurrence of "cable" and substitute --cables--.

Signed and Sealed this

Thirtieth Day of May, 1995

Attest:

BRUCE LEHMAN

*Attesting Officer*  *Commissioner of Patents and Trademarks*